(12) United States Patent
Kakiuchi

(10) Patent No.: US 11,252,116 B2
(45) Date of Patent: Feb. 15, 2022

(54) INFORMATION PROCESSING METHODS, NON-TRANSITORY COMPUTER READABLE MEDIA, AND SERVERS FOR INITIATING COMMUNICATION OVER INSTANT MESSAGE SYSTEM BASED ON VOICE CALL

(71) Applicant: LINE Corporation, Tokyo (JP)

(72) Inventor: Hideyuki Kakiuchi, Tokyo (JP)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 16/363,297

(22) Filed: Mar. 25, 2019

(65) Prior Publication Data

US 2019/0222545 A1 Jul. 18, 2019

Related U.S. Application Data

(63) Continuation of application No. PCT/JP2017/027482, filed on Jul. 28, 2017.

(30) Foreign Application Priority Data

Oct. 31, 2016 (JP) .............................. JP2016-213589

(51) Int. Cl.
*H04L 12/58* (2006.01)
*H04L 29/06* (2006.01)
(Continued)

(52) U.S. Cl.
CPC ............ *H04L 51/046* (2013.01); *G06F 13/00* (2013.01); *H04L 51/04* (2013.01); *H04L 51/28* (2013.01);
(Continued)

(58) Field of Classification Search
CPC ...... H04M 3/5141; H04M 11/00; H04M 3/00; H04M 5/00; H04M 3/51; H04M 3/5238;
(Continued)

(56) References Cited

U.S. PATENT DOCUMENTS 8,898,219 B2 * 11/2014 Ricci .................. H04M 3/44
  709/203
8,943,128 B2 * 1/2015 Fortier ................. G06Q 10/10
  709/204
(Continued)

FOREIGN PATENT DOCUMENTS

JP 2009-75927 A 4/2009
JP 2009-302868 A 12/2009
(Continued)

OTHER PUBLICATIONS

Office Action dated Feb. 19, 2020 in Korean Application No. 10-2018-7034965.
(Continued)

*Primary Examiner* — Thomas J Dailey
(74) *Attorney, Agent, or Firm* — Harness, Dickey & Pierce, P.L.C.

(57) ABSTRACT

An information processing method performed by a server includes receiving a request to initiate communication over an instant messaging system based on a connected voice call of a terminal, the request including a telephone number of the terminal, determining whether a particular user identifier of a user of the terminal is stored in a memory of the server based on the telephone number, the memory of the server storing one or more user identifiers in association with one or more telephone numbers, the one or more user identifiers being associated with the instant messaging system, and sending a message to the terminal based on the particular user identifier in response to determining the particular user identifier is stored in the memory.

21 Claims, 12 Drawing Sheets

(51) Int. Cl.
*G06F 13/00* (2006.01)
*H04M 11/00* (2006.01)
*H04M 3/51* (2006.01)
*H04M 7/00* (2006.01)
*H04M 3/523* (2006.01)

(52) U.S. Cl.
CPC .......... *H04L 51/38* (2013.01); *H04L 65/1046* (2013.01); *H04L 65/1053* (2013.01); *H04L 65/1069* (2013.01); *H04M 3/51* (2013.01); *H04M 3/5141* (2013.01); *H04M 3/5238* (2013.01); *H04M 7/0045* (2013.01); *H04M 11/00* (2013.01); *H04M 2203/306* (2013.01); *H04M 2203/651* (2013.01)

(58) Field of Classification Search
CPC ......... H04M 7/0045; H04M 2203/306; H04M 2203/651; G10L 15/083; G10L 15/26; H04W 4/14; G06F 13/00; H04L 51/04; H04L 51/046; H04L 51/28; H04L 51/38; H04L 65/1046; H04L 65/1053; H04L 65/1069

See application file for complete search history.

(56) References Cited

U.S. PATENT DOCUMENTS

| | | | |
|---|---|---|---|
| 9,049,569 B2* | 6/2015 | Appelman | H04W 4/12 |
| 9,065,915 B1* | 6/2015 | Lillard | H04M 3/42382 |
| 9,419,935 B2* | 8/2016 | Koum | H04W 4/06 |
| 9,647,872 B2* | 5/2017 | Appelman | H04L 67/306 |
| 9,756,487 B1* | 9/2017 | Ghadialy | H04M 3/42382 |
| 9,848,082 B1* | 12/2017 | Lillard | H04M 3/5231 |
| 2008/0056454 A1* | 3/2008 | Lahtiranta | H04M 3/436 379/67.1 |
| 2010/0087170 A1 | 4/2010 | Ikeda et al. | |
| 2011/0286586 A1* | 11/2011 | Saylor | H04M 3/42059 379/88.13 |

FOREIGN PATENT DOCUMENTS

| | | |
|---|---|---|
| JP | 2010-093484 A | 4/2010 |
| JP | 2011-193081 A | 9/2011 |
| JP | 2015-76641 A | 4/2015 |
| JP | 2015-121875 A | 7/2015 |
| JP | 2016-39383 A | 3/2016 |
| JP | 2016-82507 A | 5/2016 |

OTHER PUBLICATIONS

International Search Report dated Oct. 10, 2017 in International Application No. PCT/JP2017/027482.
Japanese Office Action for 2016-213589 dated May 8, 2017.
Japanese Office Action for 2016-213588 dated Apr. 28, 2017.
Japanese Office Action for corresponding Japanese Application No. 2017-209835, dated Sep. 3, 2020.

* cited by examiner

INFORMATION PROCESSING METHODS, NON-TRANSITORY COMPUTER READABLE MEDIA, AND SERVERS FOR INITIATING COMMUNICATION OVER INSTANT MESSAGE SYSTEM BASED ON VOICE CALL

CROSS-REFERENCE TO RELATED APPLICATIONS

This U.S. non-provisional application is a continuation of, and claims the benefit of priority under 35 U.S.C. § 365(c) from International Patent Application No. PCT/JP2017/027482 filed on Jul. 28, 2017 in the World Intellectual Property Organization (WIPO), which designates the United States of America and claims priority to Japanese Patent Application No. 2016-213589 filed on Oct. 31, 2016, the entire contents of which are incorporated herein by reference.

BACKGROUND

Technical Field

The present inventive concepts relate to an information processing system, an information processing method, and/or a non-transitory computer readable medium storing a program.

Background Art

In recent years, customer support techniques for using chat sessions to answer inquiries from users have been developed.

SUMMARY

According to some example embodiments, an information processing method performed by a server is provided. The information processing method includes receiving, using at least one processor of the server, a request to initiate communication over an instant messaging system based on a connected voice call of a terminal, the request including a telephone number of the terminal; determining, using the at least one processor, whether a particular user identifier of a user of the terminal is stored in a memory of the server based on the telephone number, the memory of the server storing one or more user identifiers in association with one or more telephone numbers, the one or more user identifiers being associated with the instant messaging system; and sending, using the at least one processor, a message to the terminal based on the particular user identifier in response to determining the particular user identifier is stored in the memory.

According to some example embodiments, a non-transitory computer-readable medium storing instructions is provided. When the instructions are executed by at least one processor of a server, the instructions cause the at least one processor to receive a request to initiate communication over an instant messaging system based on a connected voice call of a terminal, the request including a telephone number of the terminal; determine whether a particular user identifier of a user of the terminal is stored in a memory of the server based on the telephone number, the memory of the server storing one or more user identifiers in association with one or more telephone numbers, the one or more user identifiers being associated with the instant messaging system; and send a message to the terminal based on the particular user identifier in response to determining the particular user identifier is stored in the memory.

According to some example embodiments, a server is provided. The server includes a memory storing, computer-readable instructions, and one or more user identifiers in association with one or more telephone numbers, the one or more user identifiers being associated with an instant messaging system, and at least one processor configured to execute the computer-readable instructions to, receive a request to initiate communication over the instant messaging system based on a connected voice call of a terminal, the request including a telephone number of the terminal, determine whether a particular user identifier of a user of the terminal is stored in the memory based on the telephone number, and send a message to the terminal based on the particular user identifier in response to determining the particular user identifier is stored in the memory.

DETAILED DESCRIPTION

<Compliance with Communication Secrecy Requirements>

It should be noted that the implementation of the disclosure provided herein is carried out in compliance with legal requirements for secrecy of communication.

In the present disclosure, some example embodiments will be described with reference to the drawings.

<System Configuration>

Figure 1:
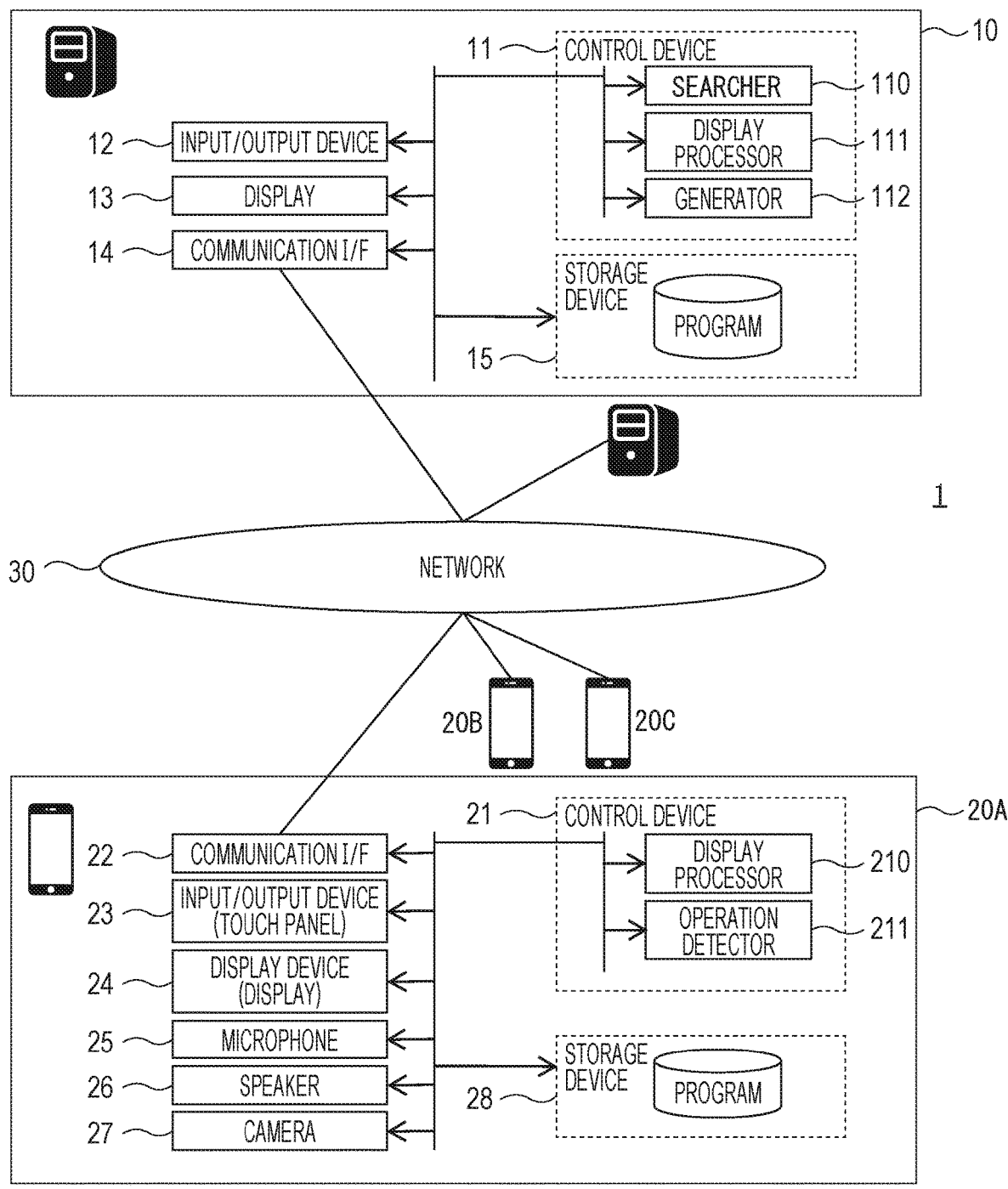
FIG. 1 is a diagram illustrating an example configuration of a system including a terminal and a server, according to some example embodiments.

FIG. 1 is a diagram illustrating a configuration of a communication system including a terminal and a server, according to some example embodiments. As illustrated in FIG. 1, in a communication system 1, a server 10 and terminals 20 (20A, 20B, and 20C) are connected to each other via a network 30. The server 10 provides a service to the terminals 20 owned by users via the network 30 to allow the terminals 20 to transmit and receive messages. There is no limitation on the number of terminals 20 to be connected to the network 30.

The network 30 serves to connect one or more terminals 20 and one or more servers 10. That is, the network 30 means a communication network that provides a connection path to enable the terminal(s) 20 once connected to the server(s) 10 to transmit and receive data.

For example, one or a plurality of portions of the network 30 may be a wired network or a wireless network. The network 30 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), at least a portion of the Internet, at least a portion of the Public Switched Telephone Network (PSTN), a mobile phone network, ISDNs (integrated service digital networks), radio LANs, LTE (long term evolution) CDMA (code division multiple access), Bluetooth (registered trademark), satellite communication, and so on, or a combination of two or more of the above networks. However, in some example embodiments, the network 30 is not limited to those described above. Further, the network 30 may include one or a plurality of networks 30.

The terminals 20 (20A, 20B, and 20C) may each be any terminal that is an information processing terminal capable of implementing functions described in some example embodiments. Each of the terminals 20 is typically a smartphone, and other examples thereof include a mobile phone (such as a feature phone), a computer (such as a desktop, a laptop, and/or a tablet), a media computer platform (such as a cable, a satellite set-top box, and/or a digital video recorder), a handheld computer device (such as a PDA (personal digital assistant) and/or an electronic mail client), a wearable terminal (an eyeglasses-type device, a watch-type device, etc.), and/or other types of computers and/or communication platforms.

However, in some example embodiments, the terminals 20 are not limited to those described above. The terminals 20 may also be referred to as information processing terminals 20.

The terminals 20A, 20B, and/or 20C may fundamentally have the same configuration, or a similar configuration, and will be each referred to as the terminal 20 in the following description, with the terminal A described as the subject terminal 20A, the terminal 20B as the other terminal 20B, and the terminal 20C as the other terminal 20C.

The server 10 may provide a determined service to the terminal 20. The server 10 may be any device that is an information processing device capable of implementing the functions described in some example embodiments. The server 10 is typically a server device, and other examples thereof include a computer (such as a desktop, a laptop, and/or a tablet), a media computer platform (such as a cable, a satellite set-top box, and/or a digital video recorder), a handheld computer device (such as a PDA and an electronic mail client), and/or other types of computers and/or communication platforms. However, in some example embodiments, the server 10 is not limited to those described above. The server 10 may also be referred to as an information processing device 10.

<Hardware (HW) Configuration>

The HW configuration of each device included in the communication system 1 will be described with reference to FIG. 1.

(1) HW Configuration of Terminal

The terminal 20 includes a control device (CPU: central processing unit) 11, a storage device 28, a communication I/F (interface) 22, an input/output device 23, a display device 24, a microphone 25, a speaker 26, and a camera 27. The constituent elements of the HW of the terminal 20 are interconnected via a bus B, for example.

The communication I/F 22 may transmit and/or receive various data via the network 30. The communication may be carried out in a wired and/or wireless manner and may be based on any communication protocol that enables mutual communication to be carried out.

The input/output device 23 includes a device that may input various operations to the terminal 20, and a device that may output processing results obtained by processing performed by the terminal 20. The input/output device 23 may be implemented by integrally forming an input device and an output device or by a separate input device and output device.

The input device may be implemented by any one of, or a combination from among, the types of devices capable of conveying information about the input to the control device 21 in response to receipt of an input from a user. The input device is typically implemented by a touch panel or the like and is configured to detect a contact of a pointing device, such as a finger of the user or a stylus, and the contact position, and convey the coordinates of the contact position to the control device 21. Alternatively, the input device may be implemented by the input/output device 23 other than a touch panel. The input device may include, for example, hardware keys, typically, a keyboard or the like, a pointing device such as a mouse, a camera (an operation input via a moving image), and/or a microphone (an operation input via audio). However, in some example embodiments, the input device is not limited to those described above.

The output device is implemented by any one of, or a combination from among, all the types of devices capable of outputting processing results obtained by processing performed by the control device 21. The output device is typically implemented by a touch panel or the like. Alternatively, the output device may be implemented by an output device other than a touch panel. The output device may include, for example, a speaker (audio output), a lens (such as a 3D (three dimensions) output and/or a hologram output), a printer, and so on. However, in some example embodiments, the output device is not limited to those described above.

The display device 24 may implemented by any one of, or a combination from among, all the types of devices capable of providing display in accordance with display data written in a frame buffer. The display device 24 is typically implemented by a monitor (such as a liquid crystal display or an OELD (organic electroluminescence display)). The display device 24 may be a head mounted display (HMD). The display device 24 may also be implemented by a device capable of displaying an image and/or text information, and so on, using projection mapping, via hologram, and/or in the air (or in a vacuum), and/or the like. The display device 24 may be capable of displaying display data in 3D. However, in some example embodiments, the display device 24 is not limited to those described above.

When the input/output device 23 is a touch panel, the input/output device 23 and the display device 24 may have substantially the same size and shape, or a similar size and shape, and may be arranged to face each other.

The control device 21 may be implemented by, for example, a data processing device embedded in hardware and including a physically structured circuit for executing codes included in a program or functions implemented as commands (also referred to herein as a "control device").

The control device 21 is typically a central processing unit (CPU), and other examples thereof may include a microprocessor, a processor core, a multiprocessor, an ASIC (application-specific integrated circuit), and/or an FPGA (field programmable gate array) (e.g., at least one processor, also referred to herein as a "control device"). However, in some example embodiments, the control device 21 is not limited to those described above.

The storage device 28 may store various programs or various data used for operating the terminal 20. The storage device 28 may be implemented by any type of storage medium such as an HDD (hard disk drive), an SSD (solid state drive), a flash memory, a RAM (random access memory), and/or a ROM (read only memory). However, in some example embodiments, the storage device 28 is not limited to those described above.

The terminal 20 may store a program P in the storage device 28 and execute the program P to allow the control device 21 to execute a process. That is, the program P stored in the storage device 28 causes the terminal 20 to implement functions to be executed by the control device 21.

The microphone 25 may be used to input audio data. The speaker 26 may be used to output audio data. The camera 27 may be used to acquire moving image data.

(2) HW Configuration of Server

The server 10 includes a control device (CPU) 11, a storage device 15, a communication I/F (interface) 14, an input/output device 12, and a display 13.

The control device 11 may be implemented by, for example, a data processing device embedded in hardware and including a physically structured circuit for executing codes included in a program or functions implemented as commands.

The control device 11 is typically a central processing unit (CPU), and other examples thereof may include a microprocessor, a processor core, a multiprocessor, an ASIC, and/or an FPGA (e.g., at least one processor). However, in some example embodiments, the control device 11 is not limited to those described above.

The storage device 15 has a function of storing various programs or various data used for operating the server 10. The storage device 15 is implemented by any type of storage medium such as an HDD, an SSD, and/or a flash memory. However, in some example embodiments, the storage device 15 is not limited to those described above.

The communication I/F 14 may transmit and/or receive various data via the network 30. The communication may be carried out in a wired and/or wireless manner and may be based on any communication protocol that enables mutual communication to be carried out.

The input/output device 12 may be implemented by a device that inputs various operations to the server 10. The input/output device 12 may be implemented by any one of, or a combination from among, all the types of devices capable of conveying information about the input to the control device 11 in response to receipt of an input from a user. The input/output device 12 is typically implemented by hardware keys, typically, a keyboard or the like, and/or by a pointing device such as a mouse. The input/output device 12 may include, for example, a touch panel, a camera (an operation input via a moving image), and/or a microphone (an operation input via audio).

However, in some example embodiments, the input/output device 12 is not limited to those described above.

The display 13 is typically implemented by a monitor (such as a liquid crystal display or an OELD (organic electroluminescence display)). The display 13 may be a head mounted display (HMD) and/or the like. The display 13 may be capable of displaying display data in 3D. However, in some example embodiments, the display 13 is not limited to those described above.

In some example embodiments, operations are described as being implemented by the CPU in the terminal 20 and/or the server 10 by executing the program P.

In the terminal 20 and/or the server 10, the control device 11 and/or the control device 21 may implement each process by not only using the CPU but also using a logic circuit (hardware) that is formed on an integrated circuit (an IC (Integrated Circuit) chip or LSI (Large Scale Integration)) or the like, or using a dedicated circuit. The circuits described above may be implemented by one or a plurality of integrated circuits, and the plurality of processes provided in some example embodiments may be implemented by a single integrated circuit. LSI may be referred to as VLSI, super LSI, ultra LSI, and/or the like depending on the degree of integration.

The program P (software program/computer program) in some example embodiments may be provided on a computer-readable storage medium. The storage medium is capable of storing a program in a "non-transitory tangible medium".

The storage medium may include one or a plurality of semiconductor-based or other integrated circuits (ICs) (such as field-programmable gate arrays (FPGAs) and/or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM drives, Secure Digital cards and/or drives, any other suitable storage medium, or any suitable combination of two or more of these, where appropriate. A storage medium may be volatile, non-volatile, or a combination of volatile and non-volatile, where appropriate. A storage medium is not limited to these examples and may be any device or medium that is capable of storing the program P.

The terminal 20 implements the functions of a plurality of functional units (e.g., the display processor 210 and/or the operation detector 211) by, for example, reading the program P stored in a storage medium and executing the read program P.

The program P of the present disclosure may be provided to the server 10 and/or the terminal 20 via any transmission medium (such as a communication network or broadcast waves) that is capable of transmitting the program P. The server 10 and/or the terminal 20 implements the functions of a plurality of functional units (e.g., the searcher 110, the display processor 111, the generator 112, the display processor 210 and/or the operation detector 211) by, for example, executing the program P, which is downloaded via the Internet or the like.

Some example embodiments described below may also be implemented in the form of a data signal embedded in a carrier wave in which the program P described above is embodied by electronic transmission.

According to some example embodiments, the program is implementable using, for example, a script language such as ActionScript and/or JavaScript (registered trademark), an object oriented programming language such as Objective-C and/or Java (registered trademark), a markup language such as HTML5, and/or the like. However, some example embodiments are not limited to these.

Some example embodiments are provided in which, when determining that a certain amount of time is taken to answer an incoming call from a customer, a center server 40 located in a call center checks whether an answer should be provided via an instant messaging system.

Figure 2:
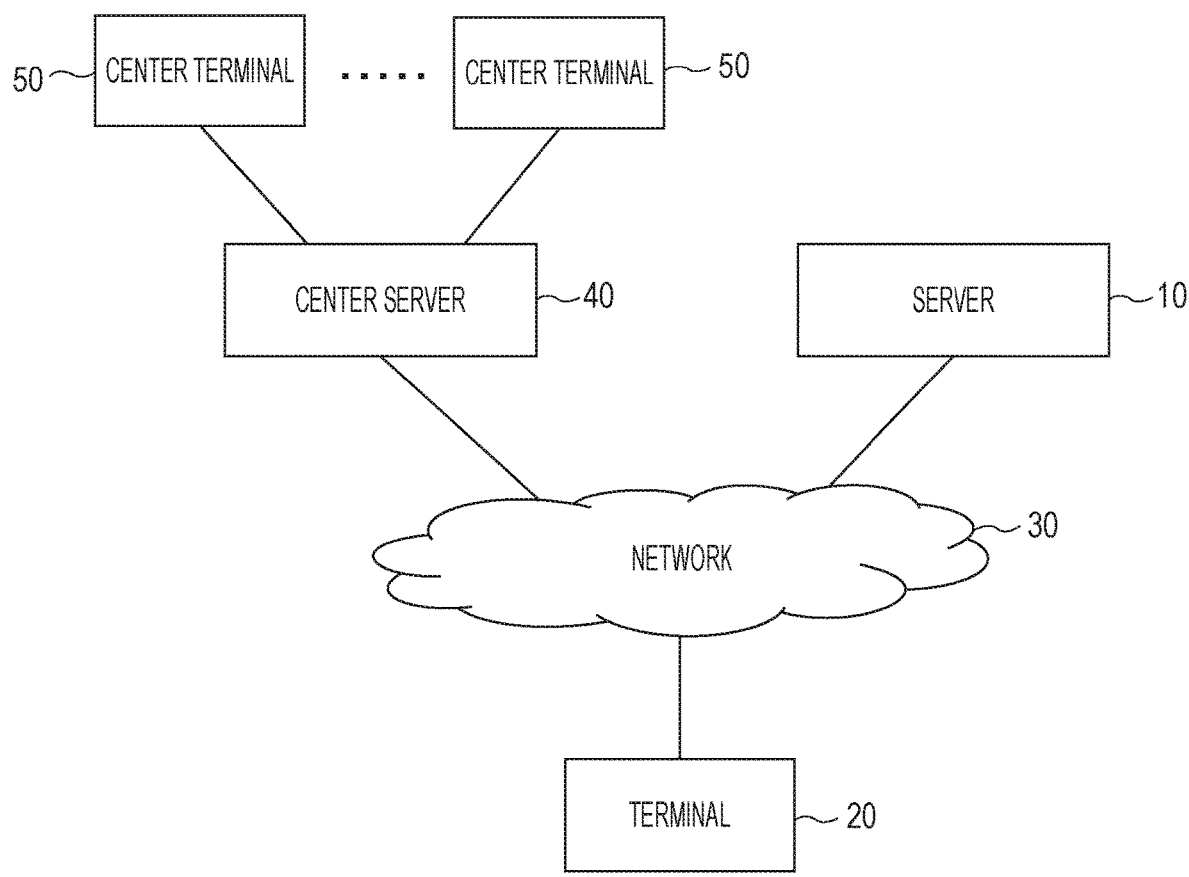
FIG. 2 is a diagram illustrating an example configuration of a system including the terminal, the server, a center server and a center terminal, according to some example embodiments.

FIG. 2 is a diagram illustrating an example configuration of a communication system including the terminal, the server, a center server and a center terminal, according to some example embodiments.

As illustrated in FIG. 2, the communication system includes the server 10, the terminal 20, and the network 30. The communication system also includes the center server 40 and center terminals 50 which are located in the call center.

In FIG. 2, the server 10 is a device capable of providing an instant messenger service. The terminal 20 is a device owned by (e.g., associated with) a customer. The center server 40 and the center terminals 50 are devices installed in the call center, for example.

(Example Configuration of Center Server 40)

The center server 40 is a device that receives an incoming call from the terminal 20 and that performs a determined process.

Examples of the determined process include a process for automatically answering with a determined voice message (an automatic answering process), a call hold process, and/or a process for transitioning to an instant messaging system. The call hold process is a process for maintaining a line (e.g., a connection) with the terminal 20 while a connection between the terminal 20 and any of the center terminals 50 is established.

Figure 3:
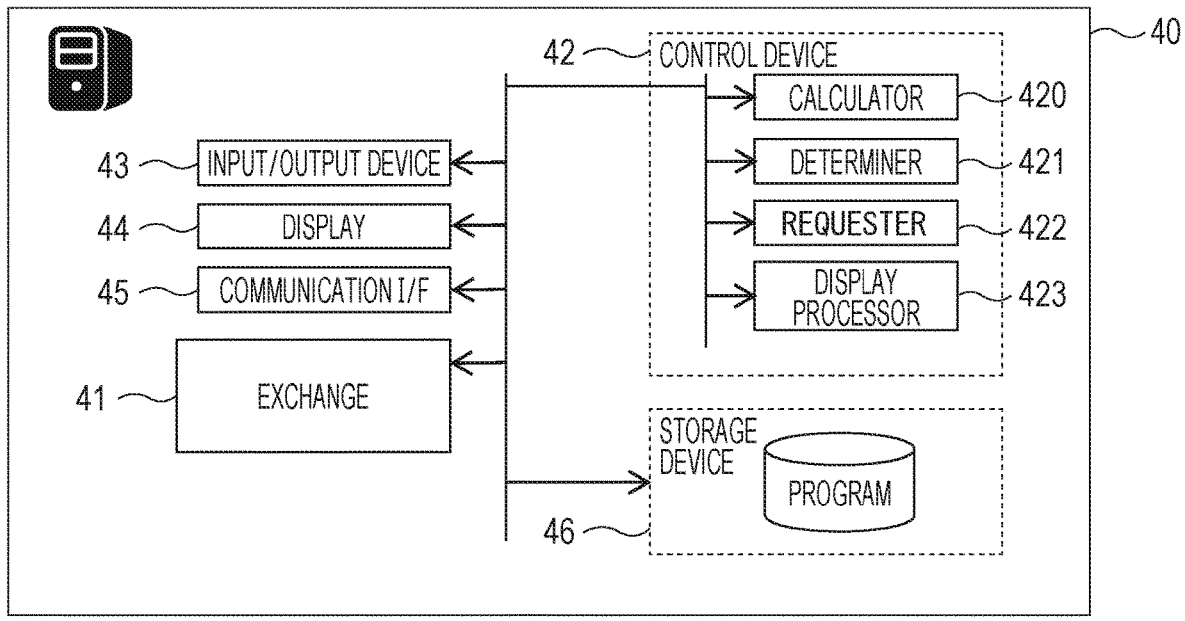
FIG. 3 is a diagram illustrating an example configuration of a center server in some example embodiments.

FIG. 3 is a diagram illustrating an example configuration of the center server 40. As illustrated in FIG. 3, the center server 40 includes an exchange 41 that may receive an incoming call from the terminal 20, a control device 42, an input/output device 43, a display 44, a communication I/F 45, and a storage device 46. In the example in FIG. 3, the exchange 41 is included in the center server 40. However, the exchange 41 may be separate from the center server 40.

The exchange 41 transfers, for example, a line (e.g., connection) with the terminal 20 to any of a plurality of transfer destinations. The transfer destinations are, for example, the center terminals 50.

The exchange 41 is, for example, a Pbx (Private Branch exchange) and/or an UnPbx. The Pbx plays a role of connecting a line from a public telephone network to a plurality of internal telephones. The line from the public telephone network is, for example, a line from the terminal 20. The plurality of internal telephones are, for example, the center terminals 50, which are used by operators in the call center, or a plurality of telephones owned by (e.g., associated with) a company or the like. The Pbx may transfer a line from the public telephone network to any of the plurality of internal telephones.

The UnPbx may execute functions of the Pbx by using a computer that processes software.

The UnPbx is capable of making flexible and efficient use of functions of the Pbx through the software.

For example, the exchange 41 transfers a line with the terminal 20 to one of the center terminals 50 which is designated by the control device 42. The exchange 41 may transfer a line with the terminal 20 to one of the center terminals 50 in accordance with a determined rule. Examples of the determined rule include randomly transferring the line to any of the center terminals 50 that is capable of answering an incoming call.

When an incoming call is made from the terminal 20, the control device 42 determines one of the center terminals 50 to which the line with the terminal 20 is to be transferred and instructs the exchange 41 to transfer the incoming call to the determined center terminal 50. If none of the plurality of center terminals 50 is capable of answering the incoming call from the terminal 20, the control device 42 instructs the exchange 41 to perform the automatic answering process.

The control device 42 is implemented by, for example, a data processing device embedded in hardware and including a physically structured circuit for executing codes included in a program or functions implemented as commands (e.g., the program may include one or more of the calculator 420, the determiner 421, the requester 422, and/or the display processor 423, as discussed below).

The control device 42 is typically a central processing unit (CPU), and other examples thereof may include a microprocessor, a processor core, a multiprocessor, an ASIC, and an FPGA. However, in some example embodiments, the control device 42 is not limited to those described above.

The control device 42 includes a calculator 420, a determiner 421, a requester 422, and a display processor 423.

When an incoming call is made from the terminal 20, the calculator 420 calculates the time (e.g., waiting time) until a connection is made between the terminal 20 and any of the center terminals 50. The calculator 420 calculates the waiting time in accordance with, for example, the number of other terminals 20 that are waiting for a connection and the number of center terminals 50 that are in operation. The calculator 420 may calculate the waiting time by using any method and may calculate the waiting time from, for example, the average value of the previous waiting times in a time period (e.g., time of day, day of week, etc.) in which the incoming call is made from the terminal 20.

If it is possible to make a quick connection to any of the center terminals 50, the calculator 420 may not calculate the waiting time or may calculate a waiting time of "zero".

When the waiting time calculated by the calculator 420 is within a determined time, the determiner 421 determines one of the center terminals 50 to be connected to the terminal 20. The determiner 421 requests the exchange 41 to perform a process for connecting the determined center terminal 50 and the terminal 20.

When the waiting time calculated by the calculator 420 exceeds the determined time, the determiner 421 determines that a process for automatically answering with a determined voice message (an automatic answering process) should be performed. The determined time may be determined in advance and may be any length, such as 3 minutes. When determining that the automatic answering process is to be performed, the determiner 421 reproduces the determined voice message via the exchange 41.

In some example embodiments, the determined voice message includes content for checking the whether the instant messaging system should be used. For example, the determined voice message may be "Our lines are busy now, and we will take a little time to answer your call. Support is also available over the instant messaging system. Please press "1" if you want to wait on hold, or press "2" if you want to send us your inquiry over the instant messaging system." In the determined voice message, the content for checking whether the instant messaging system should be used may be "Support is also available over the instant messaging system. Please press "1" if you want to wait on hold, or press "2" if you want to send us your inquiry over the instant messaging system."

The determined voice message is not limited to the example described above and may have any content including content for checking whether the instant messaging system should be used. The determined voice message may include, for example, the waiting time calculated by the calculator 420.

The determiner 421 may receive a response to the determined voice message from the terminal 20 via the exchange 41. The determiner 421 determines whether the instant messaging system should be on the basis of the response. If the response from the terminal 20 is negative for the use of the instant messaging system, the determiner 421 determines that a call hold process should be performed for the line with the terminal 20. A negative response is made when, for example, the user of the terminal 20 presses "1" in response to the determined voice message described above.

In contrast, if the response from the terminal 20 is positive for the use of the instant messaging system, the determiner 421 requests the server 10 to check whether it is possible for the terminal 20 to use the instant messaging system (e.g., a check request). A positive response is made when, for example, the user of the terminal 20 presses "2" in response to the determined voice message described above. The request for checking whether the terminal 20 is able to use the instant messaging system is a request for checking whether the terminal 20 is authorized to use the instant messaging system, and a determination of whether the terminal 20 is able to use the instant messaging system is made in accordance with, for example, whether information on the terminal 20 has been registered in the instant messaging system.

Thereafter, when receiving from the server 10 an answer indicating that the terminal 20 is able to use the instant messaging system, the determiner 421 determines one of the plurality of center terminals 50 that is to transmit and/or receive messages to and/or from the terminal 20 over the instant messaging system. Then, the determiner 421 executes the transmission of a message to the terminal 20 by using the instant messaging system via the communication I/F 45. That is, the answer indicating that it is possible to use the instant messaging system is information that triggers the transmission of a message to the terminal 20 by using the instant messaging system.

In contrast, when receiving from the server 10 an answer indicating that the terminal 20 is not able to use the instant messaging system, the determiner 421 determines that a call hold process should be performed for the line with the terminal 20. In this case, the determiner 421 may reproduce a voice message that provides a notification that the instant messaging system cannot be used via the exchange 41. After reproducing the voice message that provides a notification that the instant messaging system cannot be used, the determiner 421 performs a call hold process. That is, the answer indicating that the terminal 20 is not able to use the instant messaging system is information that triggers the reproduction of a voice message that notifies the terminal 20 that the instant messaging system cannot be used and is also information that triggers a call hold process to be executed.

The voice message that provides a notification that the instant messaging system cannot be used includes, for example, content indicating that the terminal 20 is not able to use the instant messaging system. For example, the voice message that provides a notification that the instant messaging system cannot be used may be "Your connection to the instant messaging system has failed. Please check the setup of your telephone number in the instant messaging system and try to contact us again or wait on hold for a while."

The voice message that provides a notification that the instant messaging system cannot be used is not limited to the example described above and may have any content including content indicating that it is not possible to use the instant messaging system.

The requester 422 notifies the server 10 of a check request including the telephone number of the terminal 20 in accordance with the request from the determiner 421. The check request may include one or more of the telephone number of the terminal 20, the telephone number of the center terminal 50 and/or the center server 40, an identifier capable of uniquely identifying an instant messenger account related to the center terminal 50 and/or the center server 40, text of a message to be transmitted to the terminal 20, and so on.

The display processor 423 may cause display data to be displayed via the display 44. The display processor 423 may convert data for display into pixel information and/or write the pixel information in a frame buffer of the display 44.

The input/output device 43 may be implemented by a device that inputs various operations to the center server 40. The input/output device 43 may be implemented by any one of, or a combination from among, all the types of devices capable of conveying, in response to receipt of an input from a user, information about the input to the control device 42.

The input/output device 43 is typically implemented by hardware keys, such as, a keyboard or the like, and/or by a pointing device such as a mouse. The input/output device 43 may include, for example, a touch panel, a camera (an operation input via a moving image), and/or a microphone (an operation input via audio). However, in some example embodiments, the input/output device 43 is not limited to those described above.

The display 44 is typically implemented by a monitor (such as a liquid crystal display or an OELD (organic electroluminescence display)).

The display 44 may be a head mounted display (HMD) or the like. The display 44 may be capable of displaying display data in 3D. However, in some example embodiments, the display 44 is not limited to those described above.

The communication I/F 45 may transmit and/or receive various data via the network 30. The communication may be carried out in a wired and/or wireless manner and may be based on any communication protocol that enables mutual communication to be carried out.

The storage device 46 may store various programs and/or various data used for operating the center server 40. The storage device 46 may be implemented by any type of storage medium such as an HDD, an SSD, and/or a flash memory. However, in some example embodiments, the storage device 46 is not limited to those described above.

(Example Configuration of Center Terminal 50)

Figure 4:
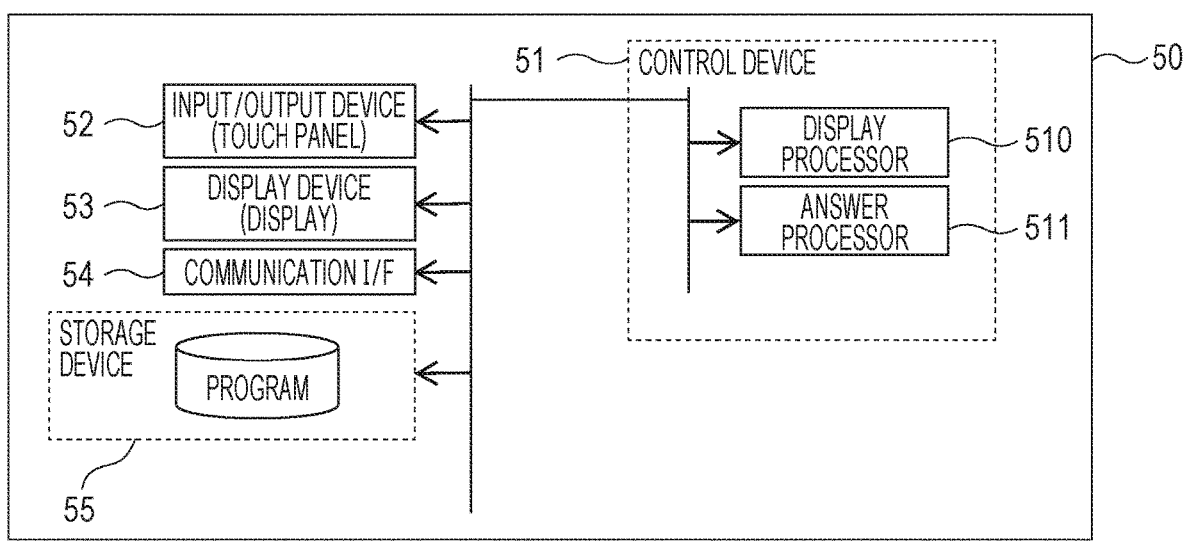
FIG. 4 is a diagram illustrating an example configuration of a center terminal in some example embodiments.

FIG. 4 is a diagram illustrating an example configuration of each of the center terminals 50. As illustrated in FIG. 4, the center terminal 50 includes a control device 51, an input/output device 52, a display 53, a communication I/F 54, and a storage device 55.

As illustrated in FIG. 4, the control device 51 includes a display processor 510 and an answer processor 511.

The display processor 510 may cause display data to be displayed via the display 53. The display processor 510 may convert data for display into pixel information and/or write the pixel information in a frame buffer of the display 53.

The answer processor 511 may execute a process for answering an incoming call from the terminal 20.

The answer processor 511 may establish a connection with the terminal 20 over a telephone line. As a result, a telephone conversation may be held between the center terminal 50 and the terminal 20 over the telephone line. Further, the answer processor 511 may establish a connection with the terminal 20 via a communication line to transmit and/or receive messages to and/or from the terminal 20 via the instant messaging system, and/or to answer a telephone call via the instant messaging system. As a result, communication may be performed between the center terminal 50 and the terminal 20 via the communication line.

The answer processor 511 may transmit audio data input from the input/output device 52, data input using a keyboard, and/or the like to the terminal 20 via a telephone line and/or a communication line. For example, the answer processor 511 may transmit data input by an operator in the call center and/or the like through the input/output device 52 to the terminal 20.

When an instruction is given by the center server 40 to answer over a telephone line, the answer processor 511 may facilitate a telephone conversation with the terminal 20 over a telephone line.

In contrast, when an instruction is given by the center server 40 to transmit and/or receive messages by using the instant messaging system, the answer processor 511 may transmit a message to the terminal 20 by using the instant messaging system.

The input/output device 52 may be implemented by a device that inputs various operations to the center terminal 50. The input/output device 52 may be implemented by any one of, or a combination from among, all the types of devices capable of conveying, in response to receipt of an input from a user, information about the input to the control device 51. The input/output device 52 is typically implemented by hardware keys, typically, a keyboard or the like, and/or by a pointing device such as a mouse. The input/output device 52 may include, for example, a touch panel, a camera (an operation input via a moving image), and/or a microphone (an operation input via audio). However, in some example embodiments, the input/output device 52 is not limited to those described above.

The display 53 is typically implemented by a monitor (such as a liquid crystal display or an OELD (organic electroluminescence display)).

The display 53 may be a head mounted display (HMD) or the like. The display 53 may be capable of displaying display data in 3D. However, in some example embodiments, the display 53 is not limited to those described above.

The communication I/F 54 may transmit and/or receive various data via the exchange 41 of the center server 40 and/or via the network 30. The communication may be carried out in a wired and/or wireless manner and may be based on any communication protocol that enables mutual communication to be carried out.

The storage device 55 may store various programs and/or various data (e.g., the programs may include the display processor 510, the answer processor 511 and/or the generator 512 discussed below in association with FIG. 14) used for operating the center terminal 50. The storage device 55 is implemented by any type of storage medium such as an HDD, an SSD, or a flash memory. However, in some example embodiments, the storage device 55 is not limited to those described above.

The control device 51 is implemented by, for example, a data processing device embedded in hardware and including a physically structured circuit for executing codes included in a program or functions implemented as commands (e.g., the programs may include the display processor 510, the answer processor 511 and/or the generator 512 discussed below in association with FIG. 14).

The control device 51 is typically a central processing unit (CPU), and other examples thereof may include a microprocessor, a processor core, a multiprocessor, an ASIC, and an FPGA. However, in some example embodiments, the control device 51 is not limited to those described above.

(Example Configuration of Server 10)

As illustrated in FIG. 1, the server 10 includes the storage device 15. The storage device 15 stores information on the terminal 20 which has been registered in an instant messaging system provided by the server 10. The information on the terminal 20 includes, for example, the telephone number of the terminal 20. The storage device 15 stores, for example, an identifier (user identifier) capable of uniquely identifying the user of the terminal 20 in the instant messaging system and the telephone number of the terminal 20 in association with each other. The information on the terminal 20 is not limited to the telephone number.

The information on the terminal 20 stored in the storage device 15 includes information input when the user registers in the instant messaging system. The information on the terminal 20 may be automatically obtained from the terminal 20 of the user who has registered in the instant messaging system with permission from the user.

As illustrated in FIG. 1, the control device 11 of the server 10 includes a searcher 110, a display processor 111, and a generator 112.

When receiving a request for checking whether a terminal 20 is able to use the instant messaging system, the searcher 110 may perform a search to determine whether information on the terminal 20 included in the check request has been stored in the storage device 15. For example, the searcher 110 may perform a search on the basis of the telephone number of the terminal 20 included in the check request to determine whether the telephone number has been stored in the storage device 15.

If the telephone number of the terminal 20 included in the check request has been stored in the storage device 15, the searcher 110 may notify the center server 40 that the terminal 20 is able to use the instant messaging system. In contrast, if the telephone number of the terminal 20 included in the check request has not been stored in the storage device 15, the searcher 110 may notify the center server 40 that the terminal 20 is not able to use the instant messaging system.

The display processor 111 may cause display data to be displayed via the display device 13. The display processor 111 may convert data for display into pixel information and/or write the pixel information in a frame buffer of the display device 13.

The generator 112 may receive a message from the terminal 20 and/or the center terminal 50 and may generate display data for displaying the content of the message on the display device 24 of the terminal 20 and/or on the display device 53 of the center terminal 50. The generator 112 may notify the terminal 20 and/or the center terminal 50 of the generated display data via the communication I/F 14.

(Example Operation)

Figure 5:
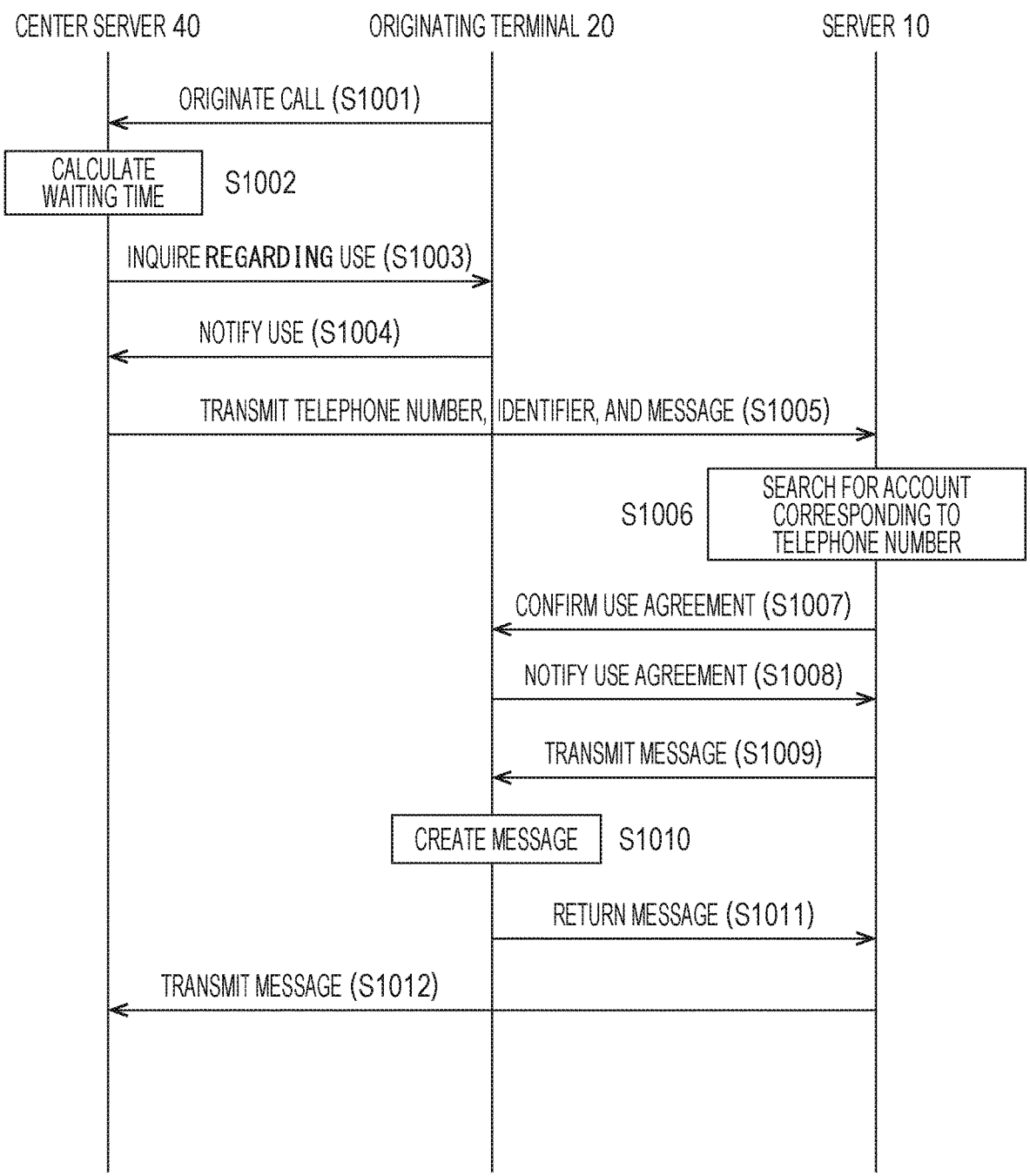
FIG. 5 is a diagram illustrating an example operation of an information processing system in some example embodiments.

FIG. 5 is a sequence diagram illustrating an example operation of an information processing system in some example embodiments.

A terminal 20 originates a call to the call center (S1001) and connects to the center server 40.

The center server 40 calculates the time (waiting time) until a connection is made between the terminal 20 and any of the center terminals 50 (S1002). Thereafter, if the calculated waiting time exceeds a determined time, the center server 40 inquires whether the instant messaging system should be used (S1003).

When receiving the inquiry about instant messaging system use, the terminal 20 notifies the center server 40 that, for example, the terminal 20 is to use the instant messaging system (S1004).

The center server 40 transmits a check request to the server 10 including the telephone number of the terminal 20 (S1005). The check request may include one or more of the telephone number of the terminal 20, the telephone number of the center terminal 50 and/or the center server 40, an identifier capable of uniquely identifying an instant messenger account related to the center terminal 50 and/or the center server 40, text of a message to be transmitted to the terminal 20, and so on.

The server 10 searches for an account corresponding to the telephone number included in the check request (e.g., the telephone number of the terminal 20) (S1006).

The server 10 may inquire whether the use of the instant messaging system is agreeable (S1007). In this case, the terminal 20 sends a response indicating an agreement to use the instant messaging system (S1008). The process for determining whether the use of the instant messaging system is agreeable is optional.

Thereafter, the server 10 transmits a message to the terminal 20 (S1009). For example, the server 10 may transmit to the terminal 20 a message for which the identifier of the terminal 20 in the instant messaging system is set as the recipient and whose sender is the instant messenger account related to the center terminal 50 and/or the center server 40.

The terminal 20 creates a message for which the center server 40 is set as the recipient in response to the received message (S1010) and transmits the message to the server 10 (S1011).

The server 10 notifies the center server 40 of the message received from the terminal 20 (S1012).

Figure 6:
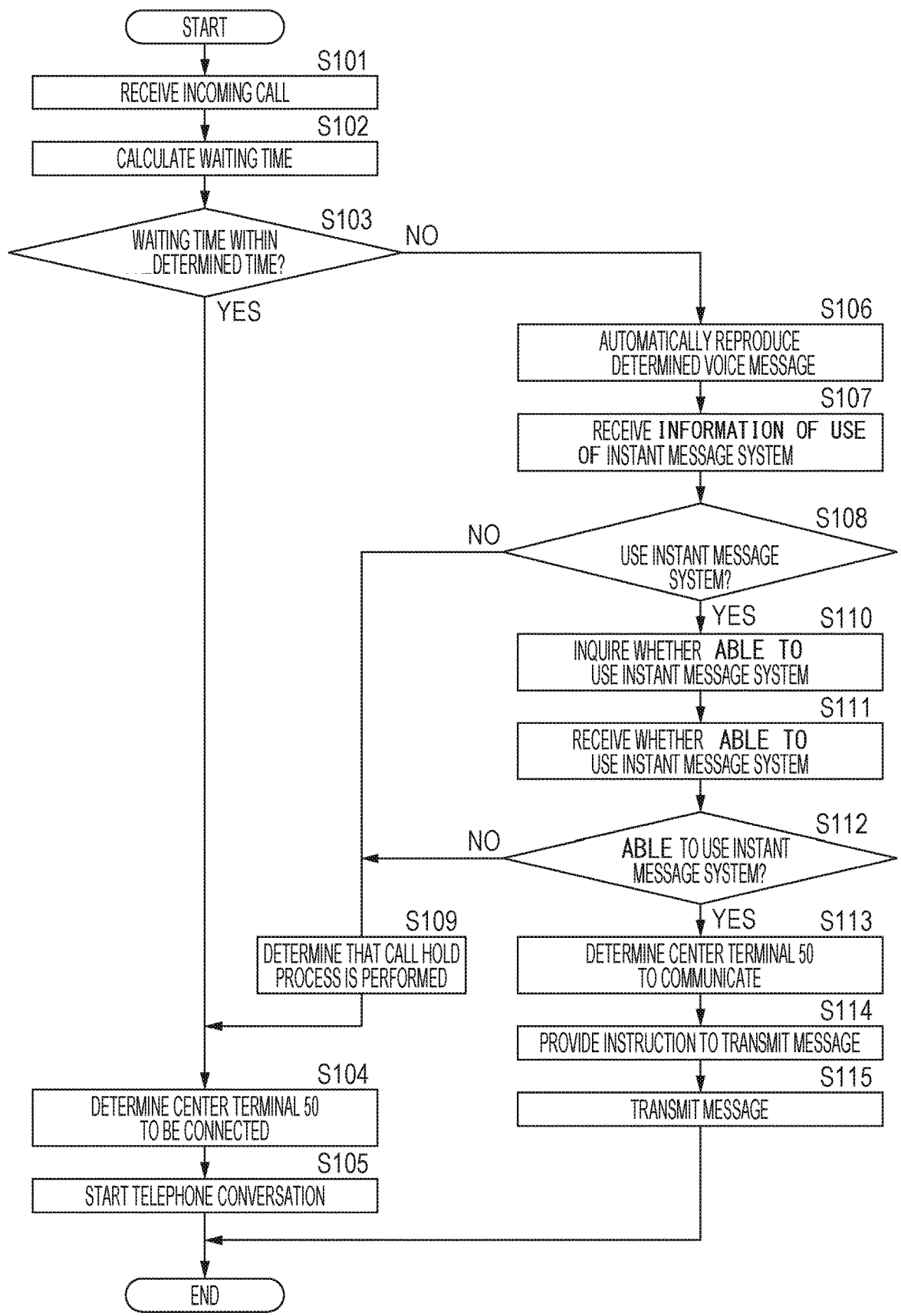
FIG. 6 is a diagram illustrating an example operation of the center server in the some example embodiments.

FIG. 6 is a flowchart illustrating an example operation of the center server 40 in some example embodiments.

The exchange 41 of the center server 40 receives an incoming call from a terminal 20 (S101).

When an incoming call is made from a terminal 20, the calculator 420 of the center server 40 calculates the time (waiting time) until a connection is made between the terminal 20 and any of the center terminals 50 (S102).

The determiner 421 determines whether the waiting time calculated by the calculator 420 is within a determined time (S103).

If the waiting time is within the determined time (YES in S103), the determiner 421 determines one of the center terminals 50 to be connected to the terminal 20 (S104). Then, the determiner 421 requests the exchange 41 to perform a process for connecting the determined center terminal 50 and the terminal 20 (S105). As a result, the center terminal 50 carries out a telephone conversation with the terminal 20 over a telephone line.

In contrast, if the waiting time exceeds the determined time (NO in S103), the determiner 421 determines that a process for automatically answering with a determined voice message (an automatic answering process) is performed, and reproduces the determined voice message (S106). Thereafter, the determiner 421 receives a response to the determined answer from the terminal 20 (S107), and determines whether to use the instant messaging system (S108).

If the response from the terminal 20 is negative for the use of the instant messaging system (NO in S108), the determiner 421 determines that a call hold process is performed for the line with the terminal 20 (S109). Then, the determiner 421 determines one of the center terminals 50 to be connected to the terminal 20 (S104) when the center terminal 50 becomes available to answer, and requests the exchange 41 to perform a process for connecting the determined center terminal 50 and the terminal 20 (S105). Then, the center terminal 50 carries out a telephone conversation with the terminal 20 over a telephone line.

If the response from the terminal 20 is positive for the use of the instant messaging system (YES in S108), the determiner 421 requests the server 10 to check whether the terminal 20 is able to use the instant messaging system (S110).

Thereafter, the determiner 421 receives from the server 10 a response indicating whether the terminal 20 is able to use the instant messaging system (S111), and determines whether the terminal 20 is able to use the instant messaging system (S112).

If an answer indicating that the terminal 20 is not able to use the instant messaging system is received from the server 10 (NO in S112), the determiner 421 of the center server 40 determines that a call hold process is performed for the line with the terminal 20 (S109). Then, the determiner 421 determines one of the center terminals 50 to be connected to the terminal 20 (S104) when the center terminal 50 becomes available to answer, and requests the exchange 41 to perform a process for connecting the determined center terminal 50 and the terminal 20 (S105). Then, the center terminal 50 carries out a telephone conversation with the terminal 20 over a telephone line.

In contrast, if an answer indicating that the terminal 20 is able to use the instant messaging system is received from the server 10 (YES in S112), the determiner 421 determines one of the plurality of center terminals 50 that is to transmit and/or receive messages to and/or from the terminal 20 over the instant messaging system (S113). The determiner 421 may instruct the determined center terminal 50 to transmit a message to the terminal 20 by using the instant messaging system (S114). Then, the center terminal 50 may transmit a message to the terminal 20 by using the instant messaging system (S115).

The provision of customer support over telephone involves the following challenges: (1) waiting with a telephone call put on hold during busy periods, (2) the difficulty in knowing when the off-peak periods are if one hangs up and calls back, and (3) the difficulty in stopping a telephone conversation midway, even if the telephone conversation is long, in order to quickly obtain a response to an inquiry.

Conventional contact center systems involve a user writing the detailed content of an inquiry in a message in advance. However, some users do not know the detailed content of an inquiry and desire to solve challenges with the support of an operator. In the conventional contact center systems, furthermore, a user is unable to send a message if the user does not know the address or the like of the contact center. In this case, the user first contacts the contact center via a telephone call.

Some example embodiments provide an information processing system, an information processing method, and/or a non-transitory computer readable medium storing a program that, when executed by a processor, can, in response to a user making an inquiry via a telephone call, handle the inquiry or provide a notification to the user by using a chat system and, thereby, reduce the user's labor and waiting time.

According to the present disclosure, it is possible to provide an information processing system and so on that can, in response to a user making an inquiry via a telephone call, handle the inquiry or provide a notification to the user by using an instant messaging system and, thereby, reduce the user's labor and waiting time.

Figure 7:
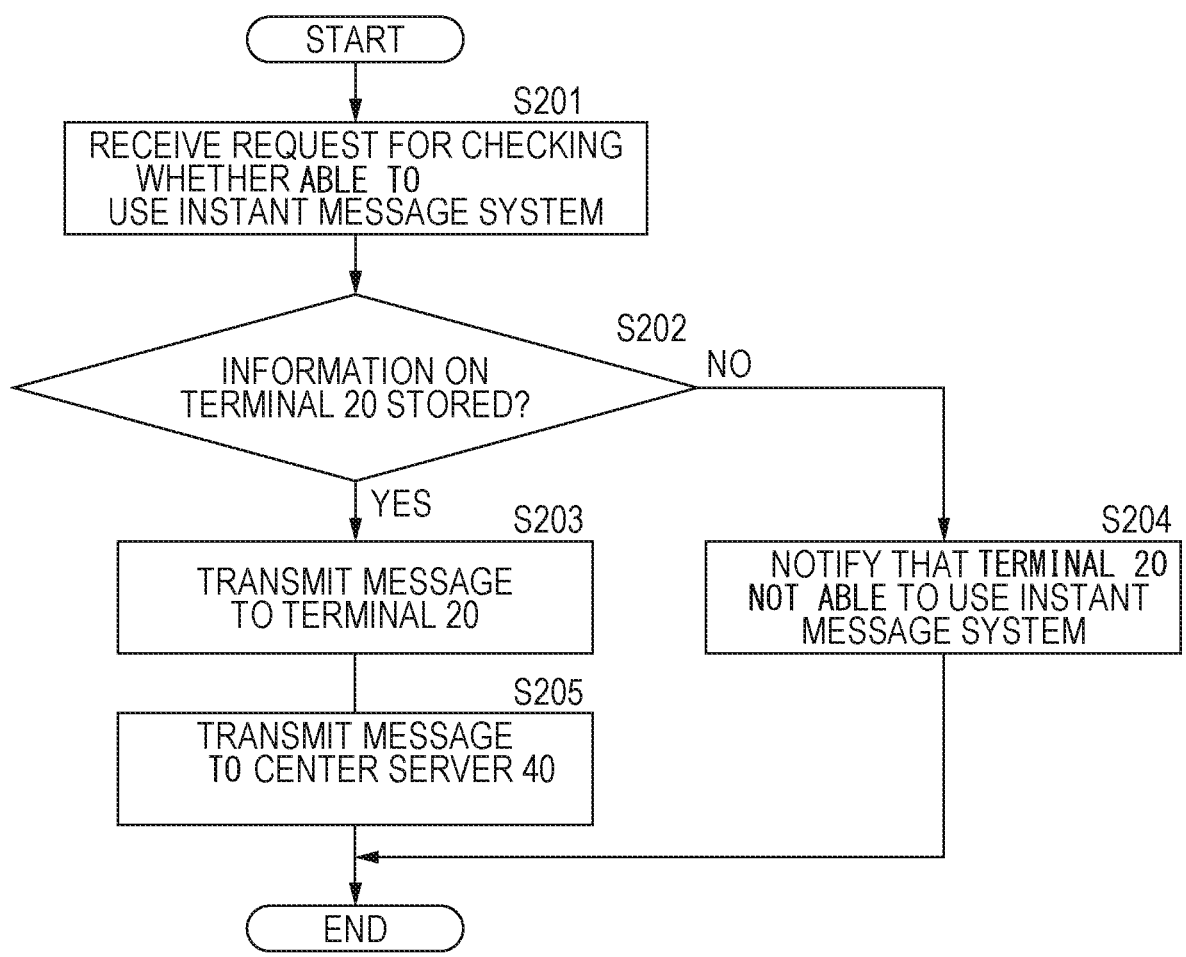
FIG. 7 is a diagram illustrating an example operation of a server in some example embodiments.

FIG. 7 is a flowchart illustrating an example operation of the server 10 in some example embodiments. The example illustrated in FIG. 7 is an example operation performed when the server 10 receives from the center server 40 a request for checking whether the terminal 20 is able to use the instant messaging system (e.g., a request to initiate communication over an instant messaging system based on a connected voice call of the terminal 20).

The searcher 110 of the server 10 receives a request for checking whether the terminal 20 is able to use the instant messaging system (S201), and carries out a search to determine whether information on the terminal 20 requested in the check request has been stored in the storage device 15 (S202).

If the telephone number of the terminal 20 included in the check request has been stored in the storage device 15 (YES in S202), the searcher 110 transmits a message to the terminal 20 (S203). For example, the server 10 may transmit to the terminal 20 a message for which the identifier of the terminal 20 in the instant messaging system is set as the recipient and whose sender is the instant messenger account related to the center terminal 50 and/or the center server 40.

Prior to the transmission of a message (S203), the server 10 may inquire whether the use of the instant messaging system is agreeable. In this case, the terminal 20 sends a response indicating an agreement to use the instant messaging system. The process for determining whether the use of the instant messaging system is agreeable is optional.

Thereafter, the server 10 notifies the center server 40 of a message received from the terminal 20 (S205).

In contrast, if the telephone number of the terminal 20 included in the check request has not been stored in the storage device 15 (NO in S202), the searcher 110 notifies the center server 40 that the terminal 20 is not able to use the instant messaging system (S204).

The searcher 110 may notify the center server 40 of an answer indicating that the terminal 20 is able to use the instant messaging system, after the user who uses the terminal 20 has agreed to the use of the instant messaging system by using the terminal 20. More specifically, for example, if the telephone number of the terminal 20 included in the check request has been stored in the storage device 15, the terminal 20 is requested to agree to the use of the instant messaging system. When the terminal 20 selects an agreement, the terminal 20 notifies the center server 40 of an answer indicating that the terminal 20 is able to use the instant messaging system via the server 10. This may prevent or reduce the transmission of a message to a wrong user even if a user identifier and a telephone number are incorrectly associated with each other.

When the check request includes one or more of the telephone number of the terminal 20, the telephone number of the center terminal 50 and/or the center server 40, an identifier capable of uniquely identifying an instant messenger account related to the center terminal 50 and/or the center server 40, text of a message to be transmitted to the terminal 20, and/or so on, the server 10 may transmit to the terminal 20 a message for which the identifier of the terminal 20 in the instant messaging system is set as the recipient and whose sender is the instant messenger account related to the center terminal 50 and/or the center server 40.

According to some example embodiments, a message to be transmitted from any one of the center terminals 50 to a terminal 20 over the instant messaging system prompts the user of the terminal 20 to select the content of an inquiry. To this end, the center terminal 50 transmits to the terminal 20 a message for prompting the user to select the content of an inquiry to be made from a plurality of genres.

A message displayed on Talkroom enables the user of the terminal 20 to select the content of an inquiry to be made, which eliminates or reduces the delay resulting from the user inputting the content of the inquiry to be made as a message, enhancing the convenience of use.

When an instruction is given by the center server 40 to transmit and/or receive messages by using the instant messaging system, the answer processor 511 transmits a message to the terminal 20 by using the instant messaging system.

The message to be transmitted to the terminal 20 includes content that allows the user to select a genre corresponding to the inquiry.

Figure 8:
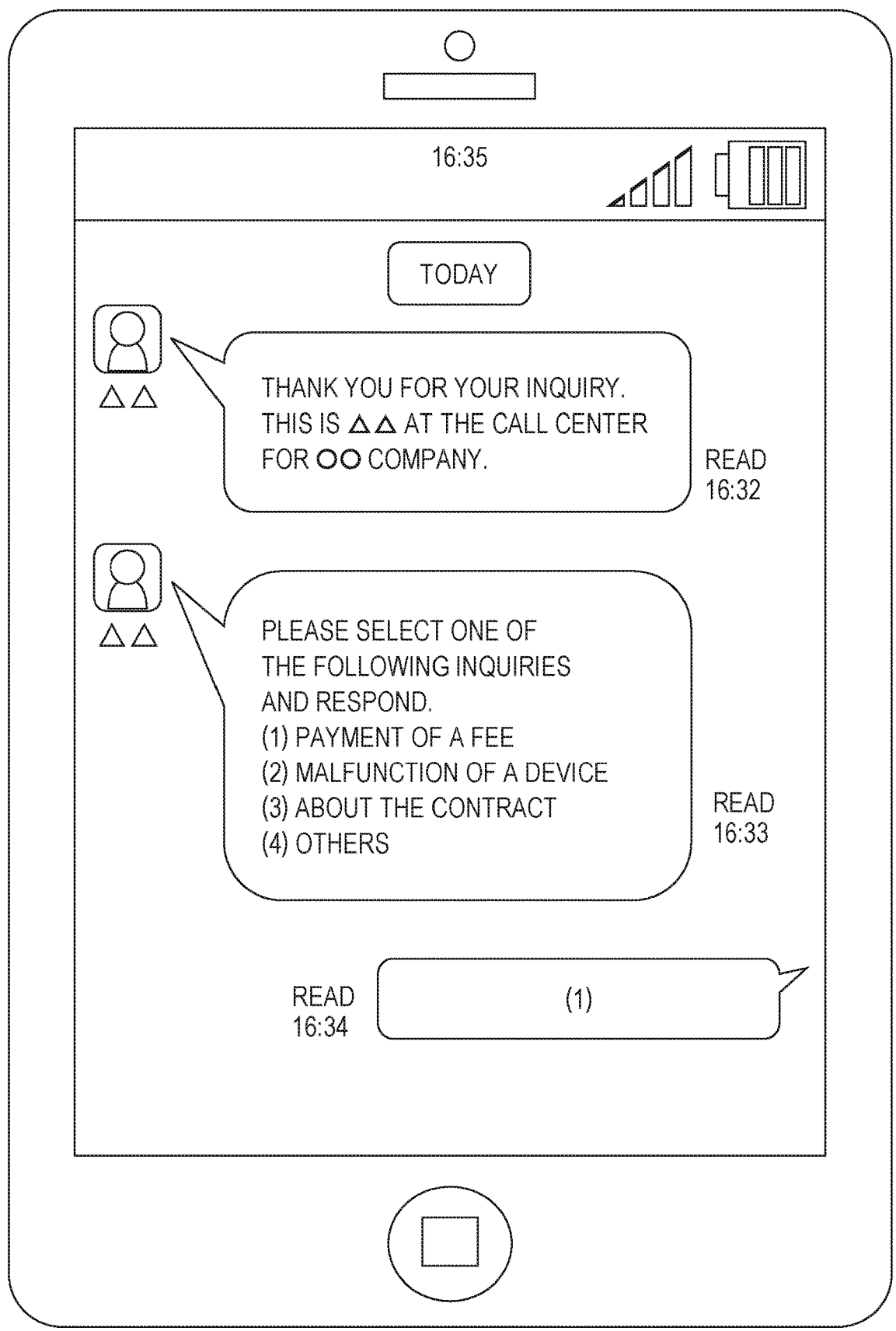
FIG. 8 is a diagram illustrating an example of content displayed on a display screen of a terminal requesting an inquiry genre selection, according to some example embodiments.

FIG. 8 illustrates an example display screen displayed on the display device 24 of the terminal 20. As illustrated in FIG. 8, a message from the center terminal 50 includes inquiry items on a plurality of genres and asks the user of the terminal 20 to select any genre.

For example, a message from the center terminal 50 includes four genres, "(1) Payment of a fee", "(2) Malfunction of a device", "(3) About the contract", and "(4) Others". The genres specified in a message are not limited to these, and any kind and/or any number of genres may be specified.

The user of the terminal 20 inputs a message for answering a message from the center terminal 50 by using the input/output device 23. For example, the user of the terminal 20 inputs the message "(1)" by using the input/output device 23.

When a message includes a link (tag) that makes a plurality of genres selectable, the user of the terminal 20 may select the link (tag).

Thereafter, the user (operator) of the center terminal 50 transmits a message including details for handling the inquiry in accordance with the genre selected by the user of the terminal 20. The user (operator) of the center terminal 50 may create a message using a determined template and transmit the message. The determined template is a model for writing a response to frequently asked content for each of a plurality of genres. The user of the center terminal 50 may select the determined template to handle the inquiry without inputting a message. The determined template may be provided as being recommended in response to the content of a document received from the user of the terminal 20, namely, a specific word.

A message that is transmitted from the center terminal 50 may include content of a response that may be selected by the user of the terminal 20 from options so as to avoid the input of long sentences.

As described above, a message displayed on Talkroom enables the user of the terminal 20 to select the content of an inquiry to be made, which eliminates or reduces the delay resulting from the user inputting the content of the inquiry to be made as a message, enhancing the convenience of use and leading to a reduction in the amount of communication data. Thus, the loads imposed on the server and the terminal may be reduced.

According to some example embodiments, the user of a terminal 20 may transmit an inquiry to any of the center terminals 50 as a message, in advance, over the instant messaging system.

The user of the terminal 20 may transmit, in advance of a request from the center terminal 50, an inquiry to be made, which enables the user (operator) of the center terminal 50 to be promptly informed of the content of the inquiry, reducing the length of time taken to respond.

When an instruction is given by the center server 40 to transmit and/or receive messages by using the instant messaging system, the answer processor 511 of the center terminal 50 transmits a message to the terminal 20 by using the instant messaging system. Alternatively, or additionally, after determining one of the center terminals 50, the center server 40 may transmit a message to the terminal 20 by using the instant messaging system for the terminal 20.

The message to be transmitted to the terminal 20 includes content for asking the user of the terminal 20 to input the content of an inquiry.

Figure 9:
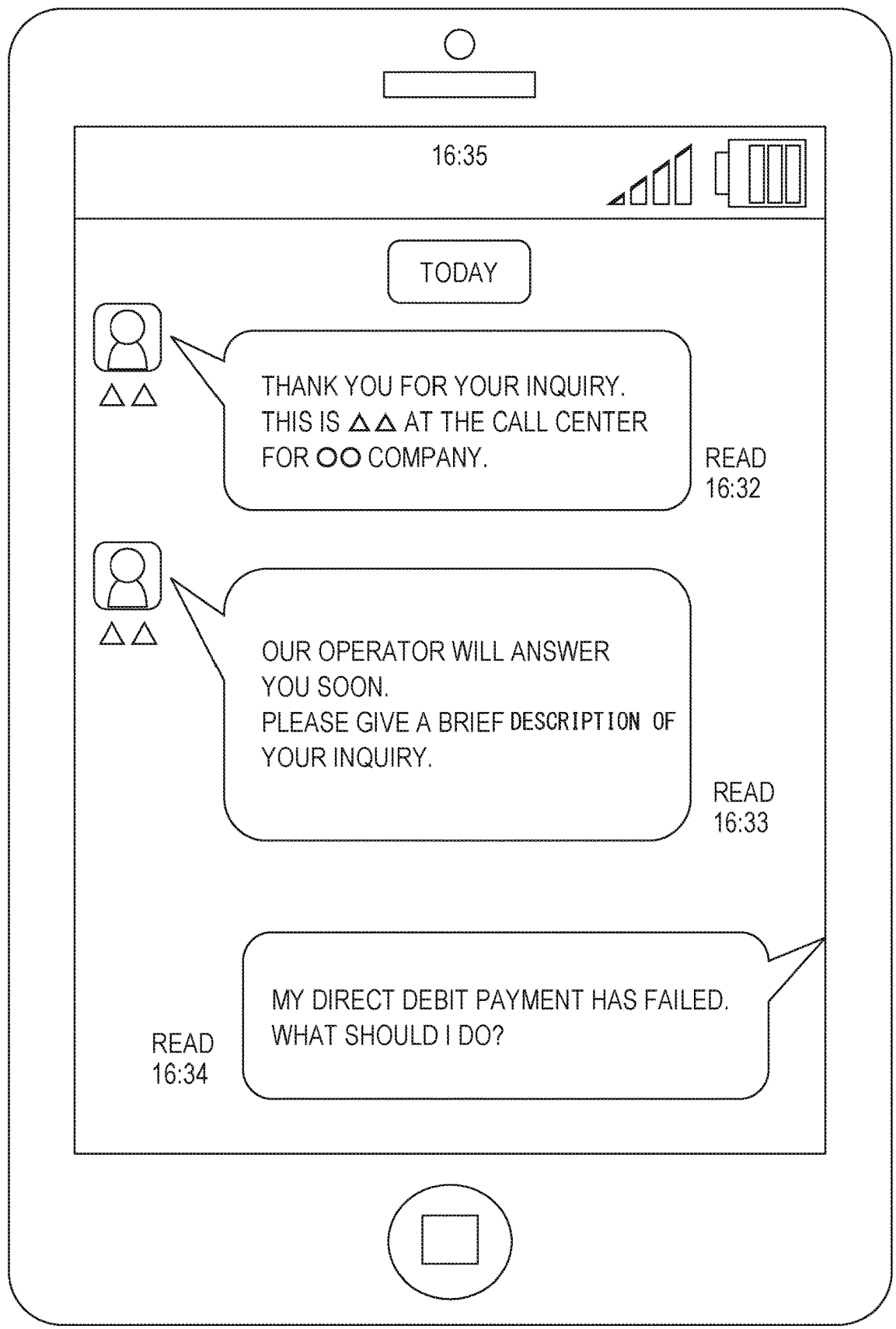
FIG. 9 is a diagram illustrating another example of the content displayed on the display screen of the terminal requesting inquiry content, according to some example embodiments.

FIG. 9 illustrates an example display screen displayed on the display device 24 of the terminal 20 requesting inquiry content, according to some example embodiments. As illustrated in FIG. 9, messages from the center terminal 50 include content for asking the input of the content of an inquiry. For example, a message from the center terminal 50 is "Our operator will answer you soon. Please give a brief description of your inquiry." The content of the message is not limited to that in the example described above, and the message may have any content.

The user of the terminal 20 may input the content of an inquiry in response to the message from the center terminal 50 by using the input/output device 23. For example, the user of the terminal 20 may input a message by using the input/output device 23 such as, "My direct debit payment has failed. What should I do?"

Thereafter, the user (operator) of the center terminal 50 may transmit a message including details for handling the inquiry in accordance with the content of the inquiry input by the user of the terminal 20. The user (operator) of the center terminal 50 may create a message using a determined template and transmit the message.

A message that is transmitted from the center terminal 50 may include content of a response that may be selected by the user of the terminal 20 from options so as to avoid the input of long sentences.

As described above, the user of the terminal 20 may transmit, in advance, an inquiry to be made, which enables the user (operator) of the center terminal 50 to be promptly informed of the content of the inquiry, reducing the length of time taken to respond.

According to some example embodiments, a message for asking the terminal 20 to "add as contact" is transmitted at the time when handling the inquiry over the instant messaging system is completed.

In the instant messaging system, when a user "adds another user as a contact", an icon corresponding to the other user is displayed in a list of other users, which is displayed on the terminal 20 of the user. As a result, the user is able to start an instant message with the other user by selecting the icon corresponding to the other user on the list.

Accordingly, the center server 40 or any one of the center terminals 50 may ask the user of the terminal 20 to "add as contact" to allow the user to connect to the center server 40 and/or the center terminal 50 by using the instant messaging system, without placing a call, at the next opportunity.

After handling over the instant messaging system is completed, the answer processor 511 of the center terminal 50 may transmit a message for asking the terminal 20 for "add as contact" by using the instant messaging system. The message may include, for example, a link (tag) that the user of the terminal 20 may select to automatically execute a process for adding the call center as a contact.

The message transmitted from the center terminal 50 may include content about a special privilege to be granted by "adding as a contact". Examples of the special privilege include the privilege of using a "stamp" offered by a company (e.g., an icon that may be displayed on Talkroom) for free.

Figure 10:
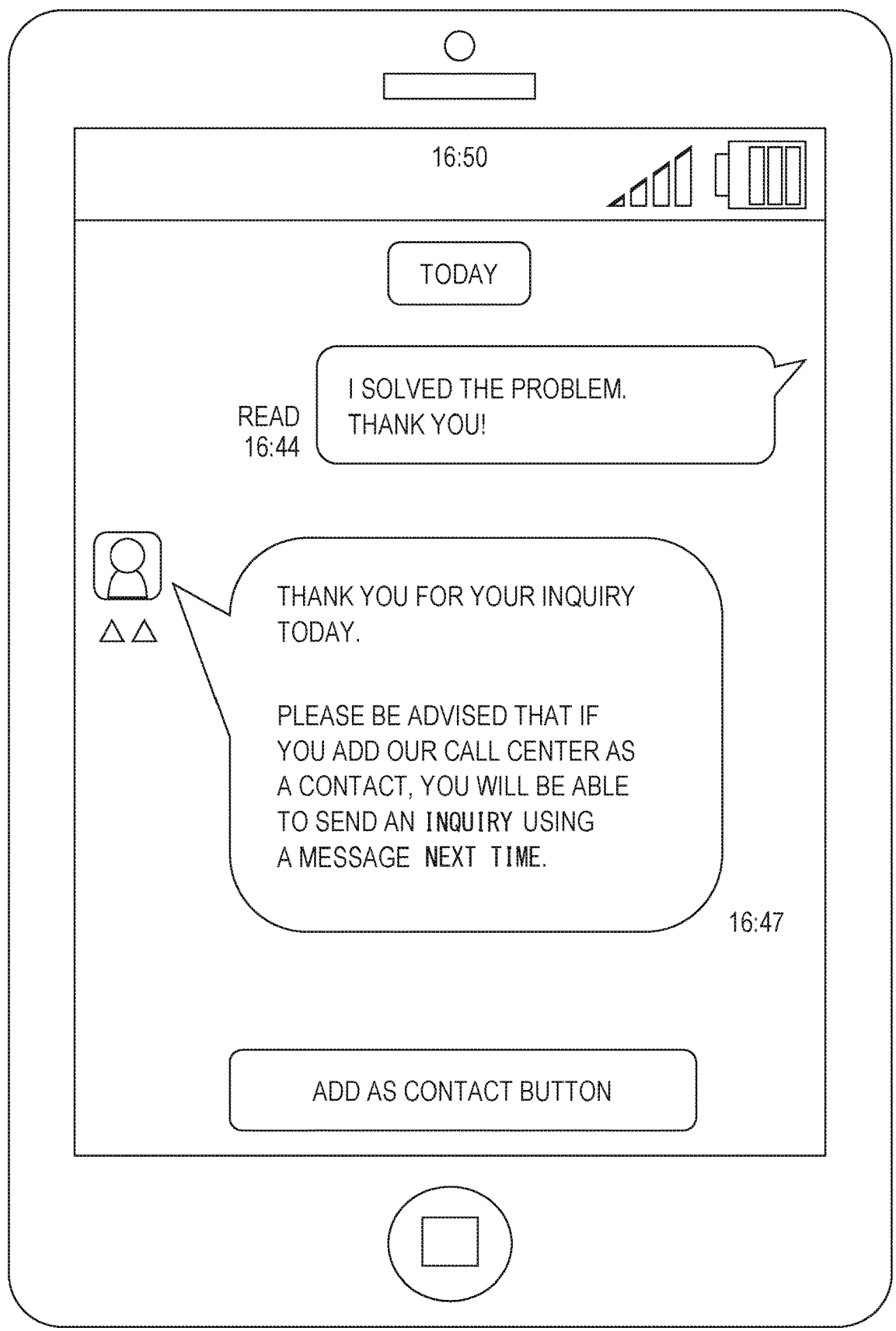
FIG. 10 is a diagram illustrating another example of the content displayed on the display screen of the terminal requesting the terminal to add the call center as a contact, according to some example embodiments.

FIG. 10 illustrates an example display screen displayed on the display device 24 of the terminal 20 requesting the terminal 20 to add the call center as a contact, according to some example embodiments. As illustrated in FIG. 10, a message from the center terminal 50 includes a message for asking to "add as contact". For example, a message from the center terminal 50 is "Thank you for your inquiry today. Please be advised that if you add our call center as a contact, you will be able to send an inquiry using a message next time." The content of the message is not limited to that in the example described above, and the message may have any content.

The message from the center terminal 50 may include an item about the special privilege, such as "You will now be able to use our original stamp for free."

The user of the terminal 20 may acknowledge that the company or the like of the center terminal 50 is "added as a contact" in accordance with a message for asking to "add as contact", which is displayed on Talkroom, thereby allowing the company to be added to a contact list.

Thus, the user of the terminal 20 may select the company in the contact list and start a conversation, thereby being able to connect to the center terminal 50, without placing a call, to ask the center terminal to handle an inquiry.

According to some example embodiments, call center handling of an inquiry over the instant messaging system may be switched to handling over telephone.

In the instant messaging system, when the user of the terminal 20 selects switching to telephone, a telephone conversation request is transmitted on the basis of the identifier of the center terminal 50. The telephone conversation request may be a telephone conversation request that is made over a telephone line or a telephone conversation request that is made over Voip (Voice over Internet Protocol).

According to some example embodiments, when determining that a certain amount of time is taken to answer an incoming call from a terminal 20, any one of the center servers 40 and/or the center terminal 50, which is located in the call center, may stop the telephone conversation and, when an answer becomes available, notify the terminal 20 by using the instant messaging system that an answer is available.

On the call center side, stopping a telephone conversation may reduce telephone call costs incurred by keeping the call on hold, whereas the user of the terminal 20 is able to be notified of a message when handling becomes available, and is able to start a telephone conversation with the operator, which eliminates or reduces the amount of time the user waits on hold.

If the waiting time calculated by the calculator 420 exceeds a determined time, the determiner 421 of the center server 40 may determine that a process for automatically answering with a determined voice message (an automatic answering process) is to be performed. The determined time may be determined in advance and may be any length such as 3 minutes. When the determiner 421 determines that the automatic answering process is to be performed, the determiner 421 may reproduce the determined voice message via the exchange 41.

The determined voice message may include content for checking a desire for a notification for the waiting time over the instant messaging system. For example, the determined voice message is "Our lines are busy now, and we will take a little time to answer your call. Please press "1" if you want to wait on hold, or press "2" if you want to receive a notification over the instant messaging system when the operator is available to handle your call." In the determined voice message, the content for checking the desire for a notification for the waiting time over the instant messaging system may be "Please press "1" if you want to wait on hold, or press "2" if you want to receive a notification over the instant messaging system when the operator is available to handle your call."

The determined voice message is not limited to the example described above and may have any content including content for checking the desire for a notification for the waiting time over the instant messaging system. The determined voice message may include, for example, the waiting time calculated by the calculator 420.

The determiner 421 may receive a response to the determined answer from the terminal 20 via the exchange 41. The determiner 421 may determine whether a notification for the waiting time over the instant messaging system should be provided on the basis of the response. If the response from the terminal 20 is a response indicating no desire for a notification for the waiting time over the instant messaging system, the determiner 421 determines that a call hold process is performed for the line with the terminal 20. A response indicating no desire for a notification is made when, for example, the user of the terminal 20 pushes "1" in response to the determined voice message described above.

In contrast, if the response is a response indicating the desire for a notification for the waiting time over the instant messaging system, the determiner 421 may request the server 10 to check whether it is possible to provide a determined notification to the terminal 20 by using the instant messaging system (e.g., whether the terminal 20 is able to receive the notification over the instant messaging system). A response indicating the desire for a notification is made when, for example, the user of the terminal 20 pushes "2" in response to the determined voice message described above. Whether it is possible to provide a determined notification to the terminal 20 by using the instant messaging system is checked in accordance with, for example, whether information on the terminal 20 has been registered in the instant messaging system. The request may be a request for checking whether the terminal 20 is authorized to use the instant messaging system.

When receiving from the server 10 an answer indicating that it is not possible to provide a determined notification by using the instant messaging system, the determiner 421 may determine that a call hold process is to be performed for the line with the terminal 20. In this case, the determiner 421 may reproduce a voice message that provides a notification that the instant messaging system cannot or will not be used via the exchange 41. After reproducing the voice message that provides a notification that the instant messaging system cannot be used, the determiner 421 may perform a call hold process.

The voice message that provides a notification that the instant messaging system cannot be used includes, for example, content indicating that it is not possible to use the instant messaging system. For example, the voice message that provides a notification that the instant messaging system cannot be used may be "Your connection to the instant messaging system has failed. Please check the setup of your telephone number in the instant messaging system and try to contact us again or wait on hold for a while."

The voice message that provides a notification that the instant messaging system cannot or will not be used is not limited to the example described above and may have any content including content indicating that it is not possible to use the instant messaging system.

When receiving from the server 10 an answer indicating that it is possible to provide a determined notification by using the instant messaging system, the determiner 421 may reproduce a voice response indicating that a notification is given from the instant messaging system, via the exchange 41. After reproducing the voice response, the determiner 421 may finishes the connection to the terminal 20 over the telephone line.

For example, the voice response indicating that a notification is given from the instant messaging system may be "We have confirmed your registration to the instant messaging system. We will notify you over the instant messaging system if you can connect to the operator. So, please hang up and wait for our call."

The voice response indicating that a notification is given from the instant messaging system is not limited to the example described above and may have any content including that a notification is given from the instant messaging system.

Thereafter, the determiner 421 may determine one of the center terminals 50 to be connected to the terminal 20 when the center terminal 50 becomes available to answer. The determiner 421 may execute the transmission of a message to the terminal 20 by using the instant messaging system via the communication I/F 45.

When an instruction is given by the center server 40 to answer over a telephone line, the answer processor 511 of the center terminal 50 may carry out a telephone conversation with the terminal 20 over a telephone line.

On the other hand, the answer processor 511 of the center terminal 50 may transmit a message to the terminal 20 in accordance with an instruction from the center server 40. The message to be transmitted to the terminal 20 may include content indicating that "a connection to the operator has become available". The message may include content indicating that "the center terminal 50 has placed a call to the terminal 20". The message may include content for checking "whether the center terminal 50 may place a call back to the terminal 20".

The message to be transmitted from the center terminal 50 to the terminal 20 may have any content and may include, for example, content indicating that the terminal 20 asks for call back.

(Example Operation)

Figure 11:
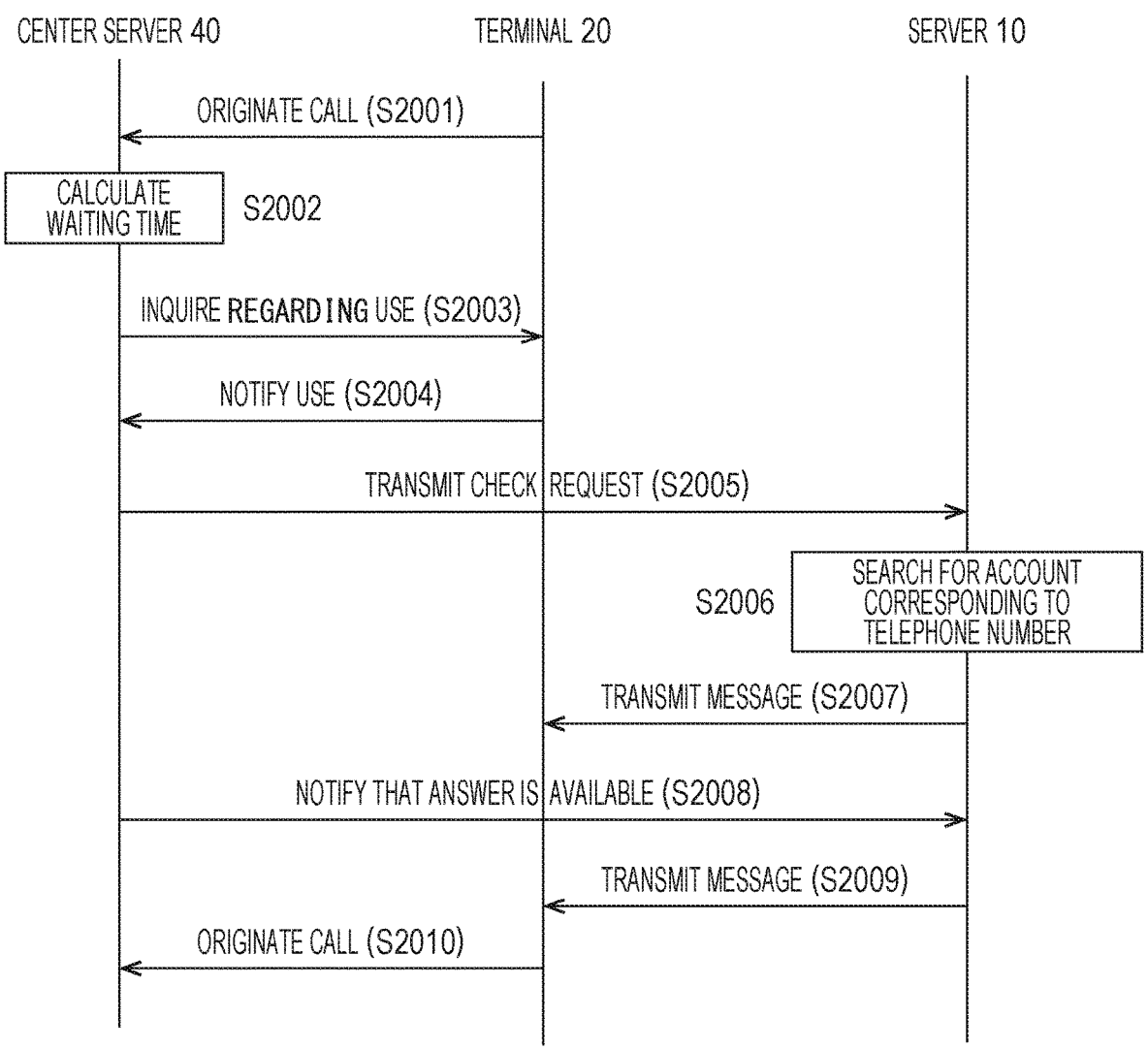
FIG. 11 is a diagram illustrating an example operation of an information processing system in which the terminal is notified when a connection to an operator becomes available, according to some example embodiments.

FIG. 11 is a sequence diagram illustrating an example operation of an information processing system in which the terminal is notified when a connection to an operator becomes available, according to some example embodiments.

A terminal 20 may originate a call to the call center (S2001) and connects to the center server 40.

The center server 40 may calculate the time (waiting time) until a connection is made between the terminal 20 and any of the center terminals 50 (S2002). Thereafter, if the calculated waiting time exceeds a determined time, the center server 40 may inquire whether the terminal 30 is able to use the instant messaging system (S2003).

When receiving the inquiry about usability, the terminal 20 may notify the center server 40 that, for example, the terminal 20 is to use the instant messaging system (S2004).

The center server 40 may notify the server 10 of a check request including the telephone number of the terminal (S2005). The check request may include the telephone number of the terminal 20, the telephone number of the center terminal 50 and/or the center server 40, an identifier capable of uniquely identifying an instant messenger account related to the center terminal 50 and/or the center server 40, text of a message to be transmitted to the terminal 20, and/or so on.

The server 10 may search for an account corresponding to the telephone number included in the check request (S2006).

Thereafter, the server 10 may transmit a message to the terminal 20 (S2007). The server 10 may transmit to the terminal 20 a message for which the identifier of the terminal 20 in the instant messaging system is set as the recipient and whose sender is the instant messenger account related to the center terminal 50 and/or the center server 40.

When handling for the terminal 20 becomes available, the center server 40 may notify the server 10 that an answer is available (e.g., a connection with a center terminal 50 is available) (S2008).

When receiving a notification indicating that an answer is available, the server 10 may transmit a message to the terminal 20. The message to be transmitted to the terminal 20 may include content indicating that "a connection to the operator has become available".

When receiving the message, the terminal 20 may originate a call to the call center (S2010) and connect to the center server 40.

Figure 12:
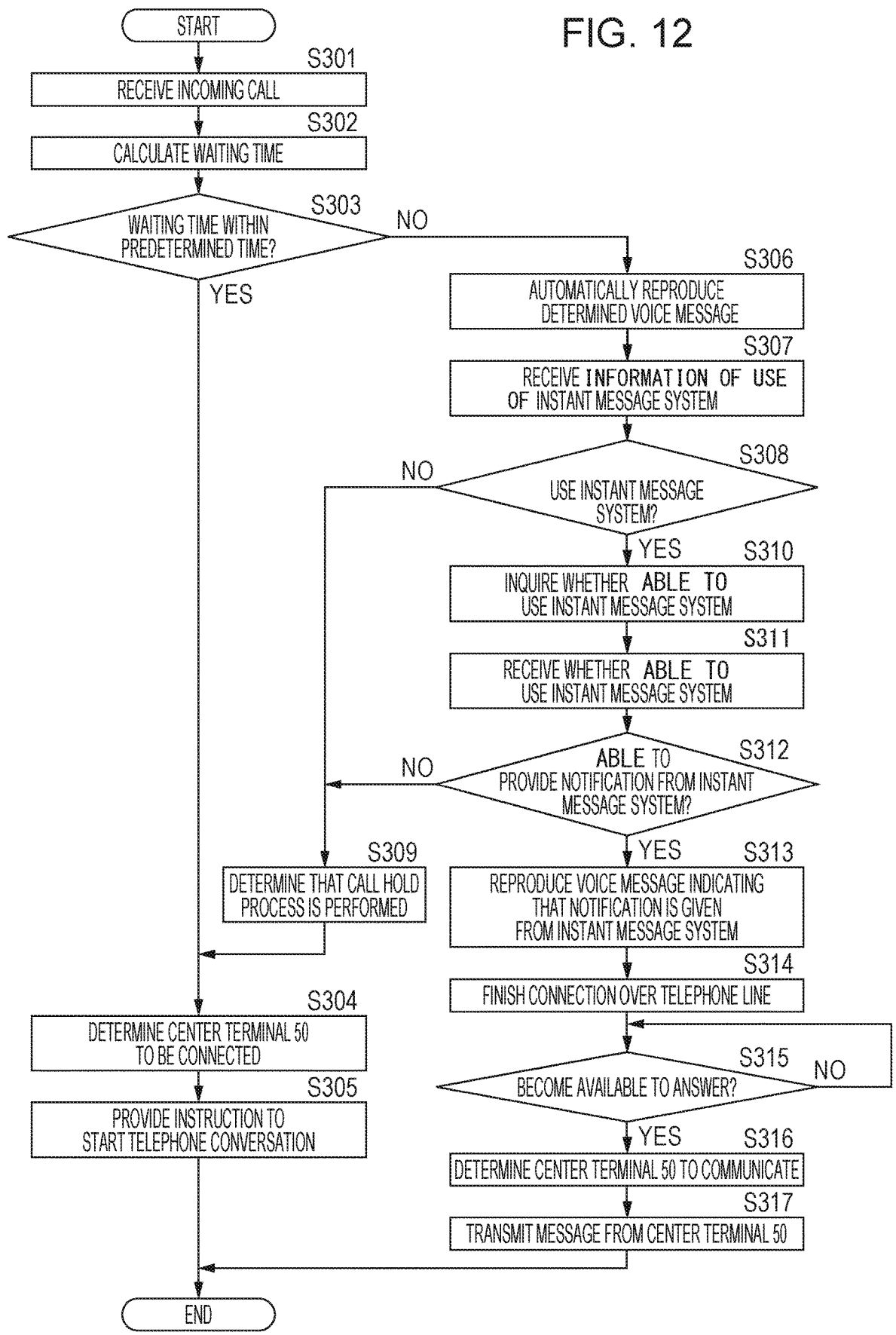
FIG. 12 is a diagram illustrating an example operation of a center server in which the terminal is notified when a connection to an operator becomes available, according to some example embodiments.

FIG. 12 is a flowchart illustrating an example operation of the center server 40 in which the terminal is notified when a connection to an operator becomes available, according to some example embodiments.

The exchange 41 of the center server 40 may receive an incoming call from a terminal 20 (S301).

When an incoming call is made from a terminal 20, the calculator 420 of the center server 40 may calculate the time (waiting time) until a connection is made between the terminal 20 and any of the center terminals 50 (S302).

The determiner 421 may determine whether the waiting time calculated by the calculator 420 is within a determined time (S303).

If the waiting time is within the determined time (YES in S303), the determiner 421 may determine one of the center terminals 50 to be connected to the terminal 20 (S304). Then, the determiner 421 may request the exchange 41 to perform a process for connecting the determined center terminal 50 and the terminal 20 (S305). As a result, the center terminal 50 may carry out a telephone conversation with the terminal 20 over a telephone line.

In contrast, if the waiting time exceeds the determined time (NO in S303), the determiner 421 may determine that a process for automatically answering with a determined voice message (an automatic answering process) is to be performed, and may reproduce the determined voice message (S306). Thereafter, the determiner 421 may receive a response to the determined voice message from the terminal 20 (S307), and may determine the whether the instant messaging system is to be used (S308).

If the response from the terminal 20 is negative for the use of the instant messaging system (NO in S308), the determiner 421 may determine that a call hold process is to be performed for the line with the terminal 20 (S309). Then, the determiner 421 may determine one of the center terminals 50 to be connected to the terminal 20 (S304) when the center terminal 50 becomes available to answer, and the center terminal 50 may request the exchange 41 to perform a process for connecting the determined center terminal 50 and the terminal 20 (S305). Then, the center terminal 50 may carry out a telephone conversation with the terminal 20 over a telephone line.

If the response from the terminal 20 is positive for the use of the instant messaging system (YES in S308), the determiner 421 may request the server 10 to check whether it is possible to provide a determined notification by using the instant messaging system (e.g., whether the terminal 20 is able to use the instant messaging system) (S310).

Thereafter, the determiner 421 may receive from the server 10 a response indicating whether it is possible to provide a determined notification by using the instant messaging system (e.g., that the terminal 20 is able to use the instant messaging system) (S311), and may determine whether it is possible to provide a determined notification by using the instant messaging system based on the response from the server 10 (S312).

When receiving from the server 10 an answer indicating that it is not possible to provide a determined notification by using the instant messaging system (NO in S312), the determiner 421 of the center server 40 may determine that a call hold process is to be performed for the line with the terminal 20 (S309). Then, the determiner 421 may determine one of the center terminals 50 to be connected to the terminal 20 (S304) when the center terminal 50 becomes available to answer, and may request the exchange 41 to perform a process for connecting the determined center terminal 50 and the terminal 20 (S305). Then, the center terminal 50 may carry out a telephone conversation with the terminal 20 over a telephone line.

When receiving from the server 10 an answer indicating that it is possible to provide a determined notification by using the instant messaging system (YES in S312), the determiner 421 may reproduce a voice response indicating that a notification is given from the instant messaging system, via the exchange 41 (S313). After reproducing the voice response, the determiner 421 may finish the connection to the terminal 20 over the telephone line (S314).

Thereafter, when any of the center terminals 50 becomes available to answer (S315), the determiner 421 may determine the center terminal 50 to be connected to the terminal 20 (S316). The determiner 421 may instruct the determined center terminal 50 to transmit a message to the terminal 20 by using the instant messaging system (S317).

An example operation of the server 10 is similar to that illustrated in FIG. 7 and thus will not be described in detail.

The searcher 110 of the server 10 may notify the center server 40 of an answer indicating that the terminal 20 is able to use the instant messaging system, after the user who uses the terminal 20 has agreed to the use of the instant messaging system by using the terminal 20. More specifically, for example, if the telephone number of the terminal 20 included in the check request has been stored in the storage device 15, the terminal 20 may be requested to agree to the use of the instant messaging system. When the terminal 20 indicates agreement, the terminal 20 may notify the center server 40 of an answer indicating that the instant messaging system may be used via the server 10. This may prevent or reduce the transmission of a message to a wrong user even if a user identifier and a telephone number are incorrectly associated with each other.

When the check request includes the telephone number of the terminal 20, the telephone number of the center terminal 50 and/or the center server 40, an identifier capable of uniquely identifying an instant messenger account related to the center terminal 50 and/or the center server 40, text of a message to be transmitted to the terminal 20, and/or so on, the server 10 may transmit to the terminal 20 a message for which the identifier of the terminal 20 in the instant messaging system is set as the recipient and whose sender is the instant messenger account related to the center terminal 50 and/or the center server 40.

As described above, when determining that a certain amount of time is taken to answer an incoming call from the terminal 20, the center server 40, when an answer becomes available, may notify the terminal 20 by using the instant messaging system that an answer is available. Thus, the user of the terminal 20 is able to be notified of a message when handling becomes available, and is able to start a telephone conversation with the operator, which eliminates or reduces the amount of time the user waits on hold. In addition, on the call center side, stopping a telephone conversation may reduce telephone call costs incurred by keeping the call on hold.

According to some example embodiments, when a message transmitted from any of the center terminals 50 to a terminal 20 is not "read", the center terminal 50 may repeatedly send the message until the message is "read".

The repeated retransmission of a message until any of the center terminals 50 receives read information may prompt the user of the terminal 20 to check the message and may ensure that the user is successfully notified that the user a connection to the operator has become available.

The answer processor 511 of the center terminal 50 may transmit a message to the terminal 20 in accordance with an instruction from the center server 40. The message to be transmitted to the terminal 20 may include content indicating that "a connection to the operator has become available".

Here, when the transmitted message is displayed on a screen (e.g., Talkroom) of the terminal 20, the communication I/F 54 of the center terminal 50 may receive read information from the server 10. The read information is information indicating that the transmitted message has been displayed on the screen (e.g., Talkroom) of the terminal 20. The term "read", as used here, is used to indicate that a determined message has been displayed on the screen (e.g., Talkroom) of the terminal 20. In contrast, the term "unread" is used to indicate that a message has not been displayed on the screen (e.g., Talkroom).

In accordance with receipt of read information, the display processor 510 of the center terminal 50 may generate display data for displaying the characters "read" near a message corresponding to the read information among messages displayed on Talkroom. For example, the display processor 510 may generate display data for displaying the characters "read" to the left of a message corresponding to the read information with a smaller font size than that of the message.

When the characters "read" are displayed for the message transmitted to the terminal 20, the center terminal 50 may start a connection to the terminal 20 over a telephone line.

If the characters "read" are not displayed for the message transmitted to the terminal 20 after a determined time has elapsed, the answer processor 511 of the center terminal 50 may retransmit the message to the terminal 20. The determined time may be determined in advance and may be any length such as 3 minutes.

The answer processor 511 of the center terminal 50 may repeatedly retransmit a message each time a determined time elapses.

The repeated retransmission of a message until any one of the center terminals 50 receives read information may prompt the user of the terminal 20 to check the message and may ensure that the user is successfully notified that the user a connection to the operator becomes available.

According to some example embodiments, a message for asking the terminal 20 to "add as contact" may be transmitted at the time when handling of an inquiry over the instant messaging system is completed.

In the instant messaging system, when a user "adds another user as a contact", an icon corresponding to the other user may be displayed in a list of other users, which may be displayed on the terminal 20 of the user. As a result, the user is able to start an instant message with the other user by selecting the icon corresponding to the other user on the list.

Accordingly, the center server 40 or any of the center terminals 50 may ask the user of the terminal 20 to "add as contact" to allow the user to connect to the center server 40 and/or the center terminal 50 by using the instant messaging system, without placing a call, during a subsequent inquiry.

After handling of an inquiry over the instant messaging system is completed, the answer processor 511 of the center terminal 50 may transmit a message for asking the terminal 20 to "add as contact" by using the instant messaging system. The message may include, for example, a link (tag) that the user of the terminal 20 is may select to automatically execute a process for adding the call center as a contact.

The message transmitted from the center terminal 50 may include content about a special privilege to be granted by "adding as a contact". Examples of the special privilege may include the privilege of using a "stamp" offered by a company (an icon that may be displayed on Talkroom) for free.

The user of the terminal 20 may acknowledge that the company or the like of the center terminal 50 is "added as a contact" in accordance with a message for asking the user to "add as contact", which is displayed on Talkroom, thereby allowing the company to be added to a contact list.

Thus, the user of the terminal 20 may select the company in the contact list and start a conversation, thereby being able to connect to the center terminal 50, without placing a call, to ask for handling of a new inquiry.

According to some example embodiments, a connection between a terminal 20 and any one of the center terminals 50 may be switched from the connection over a telephone line to the connection over a communication line. That is, an answer to an inquiry is switched from the answer over a telephone conversation to the answer over the instant messaging system.

For example, when the user of the terminal 20 stops a telephone conversation on the train or the like during answering of an inquiry, switching to an answer over the instant messaging system may prevent or reduce interruption of answering the inquiry.

The center server 40 may instruct any of the center terminals 50 to answer a call from a terminal 20 over a telephone line.

Thereafter, the center server 40 may receive a request from the center terminal 50 to switch to the transmission and/or reception of messages using the instant messaging system.

When a request is received from the center terminal 50, the determiner 421 of the center server 40 may request the server 10 to check whether the terminal 20 is able to use the instant messaging system.

When receiving from the server 10 an answer indicating that the terminal 20 is not able to use the instant messaging system, the determiner 421 may instruct the center terminal 50 to continue the telephone conversation. Specifically, the determiner 421 may transmit to the display device 53 of the center terminal 50 an instruction including display data for displaying an indication that the instant messaging system is not to be used. The display data may be created by the display processor 510 of the center terminal 50.

In contrast, when receiving from the server 10 an answer indicating that the terminal 20 is able to use the instant messaging system, the determiner 421 may instruct the center terminal 50 to make a transition to the instant messaging system. Specifically, the determiner 421 may transmit to the display device 53 of the center terminal 50 an instruction including display data for displaying an indication that a transition to the instant messaging system is to be made. The display data may be created by the display processor 510 of the center terminal 50. That is, the answer indicating that the terminal 20 is able to use the instant messaging system is information that may trigger the transmission of a message to the terminal 20 by using the instant messaging system.

When a request is received from the user of the terminal 20 to switch to the instant messaging system during the telephone conversation with the user of the terminal 20, the answer processor 511 of the center terminal 50 may transmit a request to the center server 40 to switch to the transmission and/or reception of messages using the instant messaging system. The request from the user of the terminal 20 is received via voice (by telephone) through a telephone conversation between the user (operator) of the center terminal 50 and the user of the terminal 20. The user (operator) of the center terminal 50 may make a request to switch to the transmission and/or reception of messages using the instant messaging system by using the input/output device 52.

When receiving from the server 10 an answer indicating that the terminal 20 is not able to use the instant messaging system, the answer processor 511 of the center terminal 50 may display on the display device 53 display data indicating that the instant messaging system is not to be used. Then, the user (operator) of the center terminal 50 may inform the user of the terminal 20 via voice (by telephone) that the instant messaging system cannot or will not be used, and continues handling the inquiry over the telephone conversation.

Further, when receiving an answer indicating that the terminal 20 is able to use the instant messaging system, the answer processor 511 of the center terminal 50 may display on the display device 53 display data indicating that a transition to the instant messaging system is to be made. Then, the user (operator) of the center terminal 50 may inform the user of the terminal 20 of the transition to the instant messaging system via voice (by telephone) and finishes the telephone conversation. Thereafter, the answer processor 511 of the center terminal 50 may transmit a message to the terminal 20 by using the instant messaging system.

(Example Operation)

Figure 13:
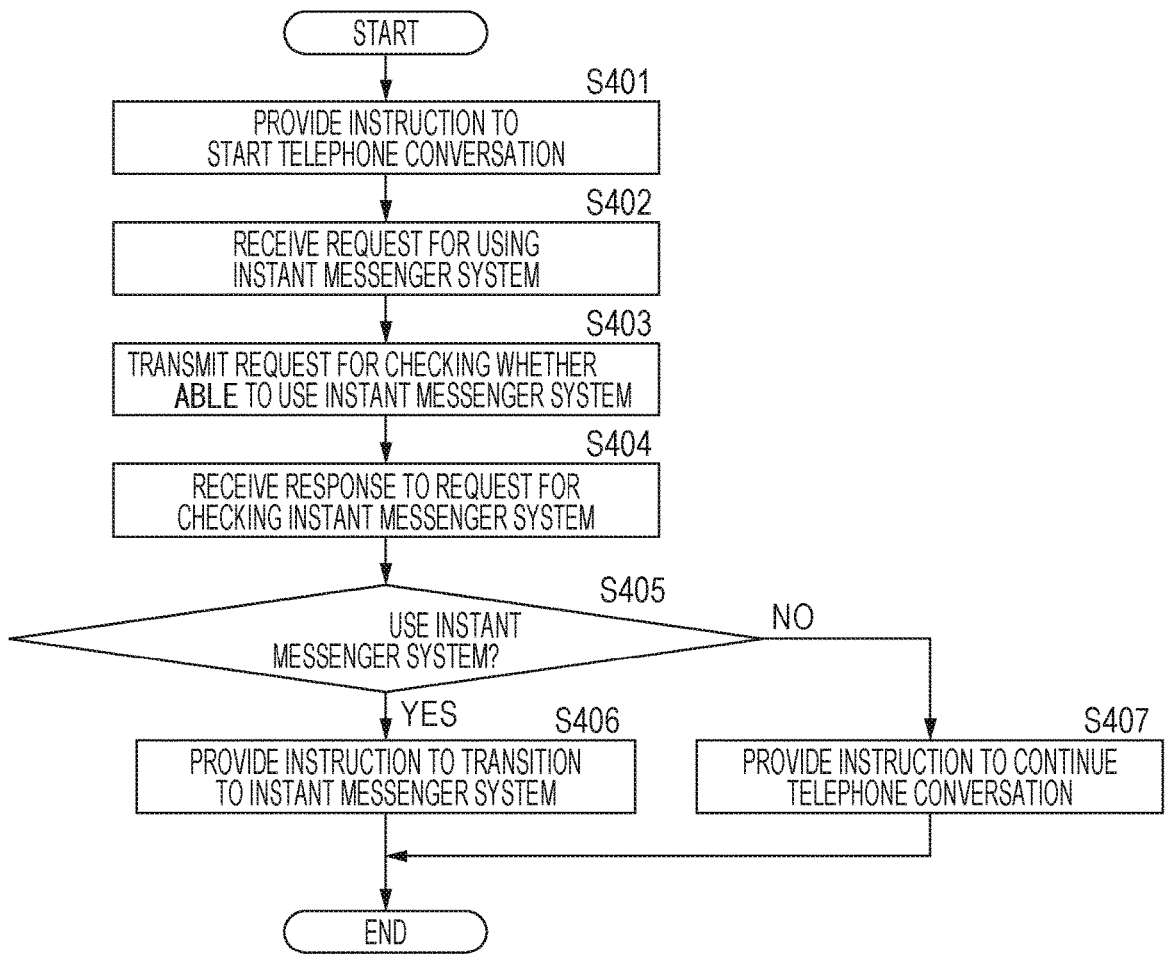
FIG. 13 is a diagram illustrating an example operation of a center server in which the center terminal requests use of the instant messaging system during a telephone call, according to some example embodiments.

FIG. 13 is a flowchart illustrating an example operation of the center server 40 in which the center terminal requests use of the instant messaging system during a telephone call, according to some example embodiments.

The center server 40 may instruct any of the center terminals 50 to answer a call from a terminal 20 over a telephone line (S401).

The center server 40 may receive a request from the center terminal 50 to switch to the transmission and/or reception of messages using the instant messaging system (S402).

When a request is received from the center terminal 50, the determiner 421 of the center server 40 may request the server 10 to check whether the terminal 20 is able to use the instant messaging system (S403).

Thereafter, the determiner 421 of the center server 40 may receive from the server 10 a response indicating whether the terminal 30 is able to use the instant messaging system (S404), and may determine whether the instant messaging system is to be used (S405).

When receiving from the server 10 an answer indicating that the terminal 20 is not able to use the instant messaging system (No at S405), the determiner 421 may instruct the center terminal 50 to continue the telephone conversation (S407).

When receiving from the server 10 an answer indicating that the terminal 20 is able to use the instant messaging system (Yes at S405), the determiner 421 may instruct the center terminal 50 to make a transition to the instant messaging system (S406).

Example operations of the server 10 with respect to the operations illustrated in FIG. 13 is similar to or the same as the example operations of the server 10 illustrated in FIG. 6 and thus will not be described in detail.

The searcher 110 of the server 10 may notify the center server 40 of an answer indicating that the terminal 20 is able to use the instant messaging system, after the user who uses the terminal 20 has agreed to the use of the instant messaging system by using the terminal 20. More specifically, for example, if the telephone number of the terminal 20 included in the check request has been stored in the storage device 15, the terminal 20 may be requested to agree to the use of the instant messaging system. When the terminal 20 indicates agreement, the terminal 20 may notify the center server 40 of an answer indicating that the terminal is able to use the instant messaging system via the server 10. This may prevent or reduce the transmission of a message to a wrong user even if a user identifier and a telephone number are incorrectly associated with each other.

When the check request includes the telephone number of the terminal 20, the telephone number of the center terminal 50 and/or the center server 40, an identifier capable of uniquely identifying an instant messenger account related to the center terminal 50 and/or the center server 40, text of a message to be transmitted to the terminal 20, and/or so on, the server 10 may transmit to the terminal 20 a message for which the identifier of the terminal 20 in the instant messaging system is set as the recipient and whose sender is the instant messenger account related to the center terminal 50 and/or the center server 40.

As described above, any of the center terminals 50 may request the center server 40 to check whether it is possible to switch to the instant messaging system. This ensures that it is possible to switch from a connection over a telephone line to a connection over a communication line, and, if switching is not possible, the connection over the telephone line may be maintained, which may prevent or reduce interruption of answering an inquiry.

According to some example embodiments, in the case of switching to the instant messaging system during handling of an inquiry over telephone, the terminal 20 may automatically receive the content exchanged in a telephone conversation as a message.

The user of the terminal 20 may receive the content exchanged in a telephone conversation as a message, and may thus check the content of the previous answer, enabling a smooth transition to an answer over the instant messaging system.

Figure 14:
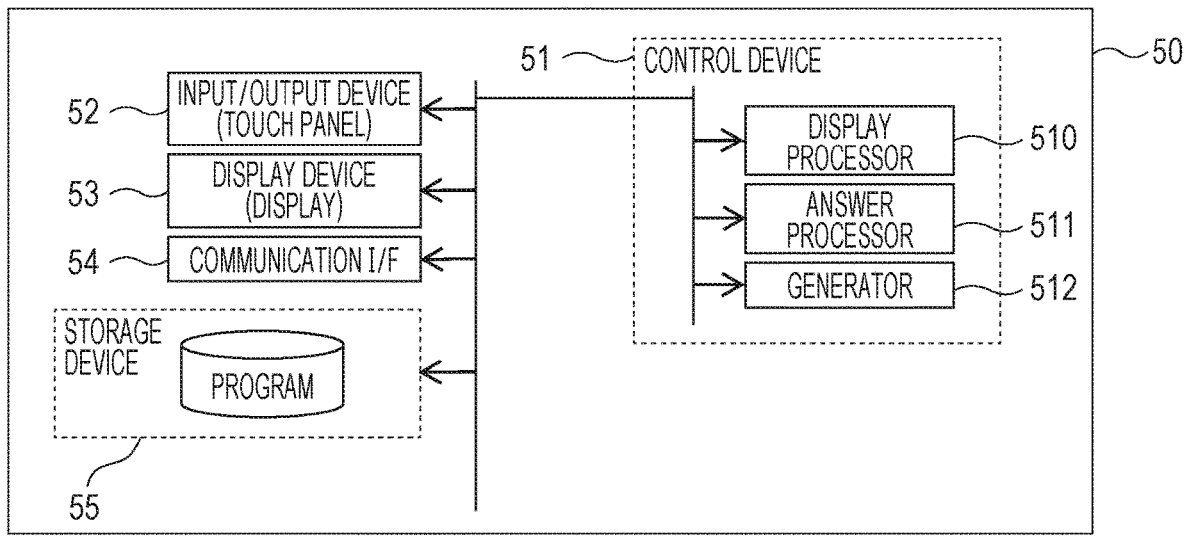
FIG. 14 is a diagram illustrating an example configuration of a center terminal including a generator, according to some example embodiments.

FIG. 14 is a diagram illustrating an example configuration of the center terminal 50 including a generator, according to some example embodiments. As illustrated in FIG. 14, the center terminal 50 includes a generator 512. With the exception of the generator 512, the configuration of the center terminal 50 is similar to or the same as that in the example configuration of the center terminal 50 illustrated in FIG. 4 and thus will not be described in detail.

The generator 512 of the center terminal 50 may generate text data, which may be obtained by converting the content of an answer over a telephone conversation with the terminal 20 to text. The generator 512 may generate data of text to which the content of an answer over a telephone conversation with the terminal 20 is converted by performing, for example, audio (e.g., speech) recognition.

Further, the generator 512 of the center terminal 50 may store the generated text data in the storage device 55.

When an answer to the terminal 20 is switched from a telephone conversation to the instant messaging system, the answer processor 511 of the center terminal 50 may transmit the text data stored in the storage device 55 to the server 10 as a message in the instant messaging system.

The generator 112 of the server 10 may create display data for displaying text data received from the center terminal 50 on Talkroom and transmit the display data to the terminal 20.

The display device 24 of the terminal 20 may display the display data received from the server 10. As a result, the user of the terminal 20 is able to check the content of an answer to the user (operator) of the center terminal 50 as text data before switching to the instant messaging system.

The user of the terminal 20 may receive the content exchanged in a telephone conversation as a message, and may thus check the content of the previous answer, enabling a smooth transition to an answer over the instant messaging system.

According to some example embodiments, a message for asking the terminal 20 to "add as contact" is transmitted at the time when handling an inquiry over the instant messaging system is completed.

In the instant messaging system, when a user "adds another user as a contact", an icon corresponding to the other user may be displayed in a list of other users, which is displayed on the terminal 20 of the user. As a result, the user is able to start an instant message with the other user by selecting the icon corresponding to the other user on the list.

Accordingly, the center server 40 or any of the center terminals 50 asks the user of the terminal 20 to "add as contact" to allow the user to connect to the center server 40 and/or the center terminal 50 by using the instant messaging system, without placing a call, for a subsequent inquiry.

After handling of an inquiry over the instant messaging system is completed, the answer processor 511 of the center terminal 50 may transmit a message for asking the terminal 20 to "add as contact" by using the instant messaging system. The message may include, for example, a link (tag) that the user of the terminal 20 may select to automatically execute a process for adding the call center as a contact.

The message transmitted from the center terminal 50 may include content about a special privilege to be granted by "adding as a contact". Examples of the special privilege may include the privilege of using a "stamp" offered by a company (e.g., an icon that may be displayed on Talkroom) for free.

The user of the terminal 20 may acknowledge that the company, or the like, of the center terminal 50 is "added as a contact" in accordance with a message for asking to "add as contact", which is displayed on Talkroom, thereby allowing the company to be added to a contact list.

Thus, the user of the terminal 20 may select the company in the contact list and start a conversation, thereby being able to connect to the center terminal 50, without placing a call, to ask for handling of an inquiry.

While some example embodiments have been described with reference to some drawings and examples, it should be noted that a person skilled in the art can easily make various changes and modifications based on the example embodiments. Thus, it should be noted that such changes and modifications are included in the scope of the example embodiments. For example, functions or the like included in each component, each operation, or the like, can be rearranged so as not to be logically inconsistent, and a plurality of components, operations, or the like, may be combined into a single component/operation or divided into separate components/operations. In addition, the configurations provided in the example embodiments described above may be combined as appropriate.

What is claimed is:

1. An information processing method performed by a server, the method comprising:
   receiving, using at least one processor of the server, a request to initiate communication over an instant messaging system based on a connected voice call of a terminal, the request including a telephone number of the terminal;
   determining, using the at least one processor, whether a particular user identifier of a user of the terminal is stored in a memory of the server based on the telephone number, the memory of the server storing one or more user identifiers in association with one or more telephone numbers, the one or more user identifiers being associated with the instant messaging system;
   sending, using the at least one processor, a first message to the terminal based on the particular user identifier in response to determining the particular user identifier is stored in the memory, the first message to the terminal indicating an identifier of an operator terminal or an identifier of the server as a sender of the first message to the terminal;
   sending a request to the terminal based on the particular user identifier to add the identifier of the operator terminal or the identifier of the server as a contact associated with the instant messaging system; and receiving a second message from the terminal via the instant messaging system after the sending the request to the terminal, the particular user identifier being a contact of the identifier of the server in the instant messaging system during the receiving the second message from the terminal.

2. The method according to claim 1, wherein the receiving the request receives the request when a hold duration of the voice call exceeds a determined time.

3. The method according to claim 1, further comprising:
sending, using the at least one processor, information indicating that the terminal is not able to use the instant messaging system to the terminal in response to determining the particular user identifier is not stored in the memory.

4. The method according to claim 3, further comprising:
sending, using the at least one processor, information indicating the voice call of the terminal is to be placed on hold in response to determining the particular user identifier is not stored in the memory.

5. The method according to claim 1, wherein the first message indicates that the terminal is able to use the instant messaging system.

6. The method according to claim 1 wherein,
the receiving the request receives the request via another server, and
the sending the first message sends the first message via the other server.

7. The method according to claim 6, wherein the sending the first message sends information indicating that the terminal is not able to use the instant messaging system to the terminal via the other server in response to determining the particular user identifier is not stored in the memory.

8. A non-transitory computer-readable medium storing instructions that, when executed by at least one processor of a server, cause the at least one processor to:
receive a request to initiate communication over an instant messaging system based on a connected voice call of a terminal, the request including a telephone number of the terminal;
determine whether a particular user identifier of a user of the terminal is stored in a memory of the server based on the telephone number, the memory of the server storing one or more user identifiers in association with one or more telephone numbers, the one or more user identifiers being associated with the instant messaging system;
send a first message to the terminal based on the particular user identifier in response to determining the particular user identifier is stored in the memory, the first message indicating an identifier of an operator terminal or an identifier of the server as a sender of the first message;
send a request to the terminal based on the particular user identifier to add the identifier of the operator terminal or the identifier of the server as a contact associated with the instant messaging system; and
receive a second message from the terminal via the instant messaging system after the request is sent to the terminal, the particular user identifier being a contact of the identifier of the server in the instant messaging system when the second message is received from the terminal.

9. The non-transitory computer-readable medium according to claim 8, wherein the instructions cause the at least one processor to receive the request when a hold duration of the voice call exceeds a determined time.

10. The non-transitory computer-readable medium according to claim 8, wherein the instructions cause the at least one processor to send information indicating that the terminal is not able to use the instant messaging system to the terminal in response to determining the particular user identifier is not stored in the memory.

11. The non-transitory computer-readable medium according to claim 10, wherein the instructions cause the at least one processor to send information indicating the voice call of the terminal is to be placed on hold in response to determining the particular user identifier is not stored in the memory.

12. The non-transitory computer-readable medium according to claim 8, wherein the first message indicates that the terminal is able to use the instant messaging system.

13. The non-transitory computer-readable medium according to claim 8, wherein the instructions cause the at least one processor to:
receive the request via another server; and
send the first message via the other server.

14. The non-transitory computer-readable medium according to claim 13, wherein the instructions cause the at least one processor to send information indicating that the terminal is not able to use the instant messaging system to the terminal via the other server in response to determining the particular user identifier is not stored in the memory.

15. A server, comprising:
a memory storing,
computer-readable instructions, and
one or more user identifiers in association with one or more telephone numbers, the one or more user identifiers being associated with an instant messaging system; and
at least one processor configured to execute the computer-readable instructions to,
receive a request to initiate communication over the instant messaging system based on a connected voice call of a terminal, the request including a telephone number of the terminal,
determine whether a particular user identifier of a user of the terminal is stored in the memory based on the telephone number,
send a first message to the terminal based on the particular user identifier in response to determining the particular user identifier is stored in the memory, the first message indicating an identifier of an operator terminal or an identifier of the server as a sender of the first message,
send a request to the terminal based on the particular user identifier to add the identifier of the operator terminal or the identifier of the server as a contact associated with the instant messaging system, and
receive a second message from the terminal via the instant messaging system after the request is sent to the terminal, the particular user identifier being a contact of the identifier of the server in the instant messaging system when the second message is received from the terminal.

16. The server according to claim 15, wherein the at least one processor is configured to execute the computer-readable instructions to receive the request when a hold duration of the voice call exceeds a determined time.

17. The server according to claim 15, wherein the at least one processor is configured to execute the computer-readable instructions to send information indicating that the terminal is not able to use the instant messaging system to the terminal in response to determining the particular user identifier is not stored in the memory.

18. The server according to claim 17, wherein the at least one processor is configured to execute the computer-readable instructions to send information indicating the voice call of the terminal is to be placed on hold in response to determining the particular user identifier is not stored in the memory.

19. The server according to claim 15, wherein the first message indicates that the terminal is able to use the instant messaging system.

20. The server according to claim 15, wherein the at least one processor is configured to execute the computer-readable instructions to:
   receive the request via another server; and
   send the first message via the other server.

21. The method according to claim 1 wherein,
   the receiving the request receives the request via another server, and
   the method further comprises sending a notification to the other server in response to determining the particular user identifier is not stored in the memory.

\* \* \* \* \*